(12) United States Patent
Al-Stouhi et al.

(10) Patent No.: US 10,168,418 B1
(45) Date of Patent: Jan. 1, 2019

(54) SYSTEM AND METHOD FOR AVOIDING SENSOR INTERFERENCE USING VEHICULAR COMMUNICATION

(71) Applicant: Honda Motor Co., Ltd., Tokyo (JP)

(72) Inventors: Samir K. Al-Stouhi, Dearborn, MI (US); Paritosh Kelkar, Dearborn, MI (US); Hasan Tafish, Farmington Hills, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/851,566

(22) Filed: Dec. 21, 2017

Related U.S. Application Data

(63) Continuation-in-part of application No. 15/686,250, filed on Aug. 25, 2017.

(51) Int. Cl.
  *G08C 19/22* (2006.01)
  *H04Q 9/00* (2006.01)
  *G01S 7/02* (2006.01)
  *G01S 17/93* (2006.01)
  (Continued)

(52) U.S. Cl.
  CPC ............ *G01S 7/023* (2013.01); *G01S 13/931* (2013.01); *G01S 15/931* (2013.01); *G01S 17/936* (2013.01); *G01S 2013/9321* (2013.01); *G01S 2013/9332* (2013.01); *G01S 2013/9353* (2013.01); *G01S 2013/9367* (2013.01)

(58) Field of Classification Search
  CPC ...... G01S 7/023; G01S 13/931; G01S 17/936; G01S 15/931; G01S 2013/9367; G01S 2013/9353; G01S 2013/9332; G01S 2013/932

USPC .................................................. 340/870.07
See application file for complete search history.

(56) References Cited

U.S. PATENT DOCUMENTS

| | | |
|---|---|---|
| 6,487,500 B2 | 11/2002 | Lemelson et al. |
| 6,552,342 B2 | 4/2003 | Holz et al. |
| 7,164,118 B2 | 1/2007 | Anderson et al. |

(Continued)

FOREIGN PATENT DOCUMENTS

WO  2004031877  4/2004

OTHER PUBLICATIONS

An Adaptive TDMA Slot Assignment Strategy in Vehicular Ad Hoc Networks http://www.riverpublishers.com/journal_read_html_article.php?j=JMMC/1/2/6.

(Continued)

*Primary Examiner* — Tanmay Shah
(74) *Attorney, Agent, or Firm* — Rankin, Hill & Clark LLP

(57) ABSTRACT

A computer-implemented method and system for controlling sensor data acquisition including establishing an operable connection for computer communication between a first vehicle and remote vehicles within a communication range. The method includes receiving capability data corresponding to the capabilities of sensors of the one or more remote vehicles, including a sensor actuation time slot. The method includes selecting a set of N remote vehicles based on the capability data. The set of N remote vehicles consists remote vehicles closest to the first vehicle, and the sensor actuation time slot of each of the remote vehicles in the set of N remote vehicles are different. The method includes dividing a clock cycle into a plurality of time slots, and controlling, according to the plurality of time slots and the sensor actuation time slot, sensor actuation.

20 Claims, 14 Drawing Sheets

(51) Int. Cl.
*G01S 13/93* (2006.01)
*G01S 15/93* (2006.01)

(56) References Cited

U.S. PATENT DOCUMENTS

| | | | |
|---|---|---|---|
| 7,280,674 | B2 | 10/2007 | Matveev |
| 7,444,240 | B2 | 10/2008 | Macneille et al. |
| 7,994,902 | B2 | 8/2011 | Avery et al. |
| 8,229,663 | B2 | 7/2012 | Zeng et al. |
| 8,812,226 | B2 | 8/2014 | Zeng |
| 8,983,771 | B2 | 3/2015 | Breed |
| 9,117,371 | B2 | 8/2015 | Hutchings |
| 9,300,423 | B2 | 3/2016 | Rubin et al. |
| 9,563,808 | B2 | 2/2017 | Zeng et al. |
| 2003/0102997 | A1* | 6/2003 | Levin .............. G01S 7/006 342/57 |
| 2006/0164292 | A1 | 7/2006 | Buechler et al. |
| 2008/0040004 | A1* | 2/2008 | Breed .......... B60R 21/0134 701/45 |
| 2008/0161986 | A1 | 7/2008 | Breed |
| 2015/0254781 | A1 | 9/2015 | Binion et al. |
| 2015/0254787 | A1 | 9/2015 | Binion et al. |
| 2015/0358481 | A1* | 12/2015 | Nagata ............... H04W 4/04 370/259 |
| 2016/0054441 | A1 | 2/2016 | Kuo et al. |
| 2016/0086032 | A1 | 3/2016 | Pickett |
| 2016/0205656 | A1 | 7/2016 | Zeng et al. |
| 2016/0223643 | A1 | 8/2016 | Li et al. |
| 2016/0349365 | A1 | 12/2016 | Ling |
| 2017/0017734 | A1 | 1/2017 | Groh et al. |
| 2017/0043771 | A1 | 2/2017 | Ibanez-guzman et al. |
| 2017/0082737 | A1* | 3/2017 | Slobodyanyuk ........ G01S 7/497 |
| 2017/0094248 | A1 | 3/2017 | Kashyap |
| 2017/0278398 | A1 | 9/2017 | Kato et al. |

OTHER PUBLICATIONS

Office Action of U.S. Appl. No. 15/686,250 dated Jul. 6, 2018, 17 pages.Office Action of U.S. Appl. No. 15/686,250 dated Jul. 6, 2018, 17 pages.

* cited by examiner

SYSTEM AND METHOD FOR AVOIDING SENSOR INTERFERENCE USING VEHICULAR COMMUNICATION

RELATED APPLICATIONS

This application is a continuation-in-part of U.S. application Ser. No. 15/686,250 filed on Aug. 25, 2017 and its entirety is expressly incorporated herein by reference.

BACKGROUND

Automotive manufacturers are continuously increasing the use of electronic systems, including sensors and automated sensing technologies, to improve safety applications and vehicle performance. For example, sensors can be used to measure data about the surroundings of a vehicle, which in turn can be used to control or automate driving functions. Thus, sensors, and the actuators that control the sensors, must be accurate and reliable to provide optimal vehicle performance.

In addition to the increasing use of sensors, many vehicles are configured for information exchange using wireless vehicle communication, for example, Vehicle-to-Vehicle (V2V), Vehicle-to-Infrastructure (V2I), and Vehicle-to-Everything (V2X) communication. Vehicles can use wireless vehicle communication to share sensor data. However, to share sensor data in a useful and reliable manner using wireless vehicle communication, vehicles must work cooperatively to acquire and transmit sensor data.

BRIEF DESCRIPTION

According to one aspect, a computer-implemented method for controlling sensor data acquisition using a vehicular communication network includes establishing an operable connection for computer communication between a first vehicle and one or more remote vehicles within a communication range of the first vehicle using the vehicular communication network. The first vehicle and the one or more remote vehicles operate based upon a common time base according to a global time signal. The method includes receiving, from each of the one or more remote vehicles, capability data corresponding to the capabilities of sensors of each of the one or more remote vehicles. The capability data includes a sensor actuation time slot of each of the one or more remote vehicles indicting a time slot at which the sensors of each of the one or more remote vehicles are actuating. The method includes selecting a set of N remote vehicles from the one or more remote vehicles based on the capability data. The set of N remote vehicles consists of those remote vehicles of the one or more remote vehicles within the communication range of the first vehicle that are closest to the first vehicle. Further, the sensor actuation time slot of each of the remote vehicles in the set of N remote vehicles are different. The method also includes dividing a clock cycle into a plurality of time slots based on the set of N remote vehicles, and controlling, according to the plurality of time slots and the sensor actuation time slot, sensor actuation of a sensor of the first vehicle and the sensors of each of the remote vehicles in the set of N remote vehicles.

According to another aspect, a system for controlling sensor data acquisition using a vehicular communication network includes a first vehicle with a first vehicle sensor, where the first vehicle is configured for computer communication with one or more remote vehicles using the vehicular communication network. The one or more remote vehicles are within a communication range of the first vehicle and the one or more remote vehicles include sensors. The system includes a processor of the first vehicle that is configured to receive capability data from each of the one or more remote vehicles. The capability data indicates the capabilities of the sensors of each of the one or more remote vehicles, and the capability data includes a sensor actuation time slot of each of the one or more remote vehicles indicting a time slot at which the sensors of each of the one or more remote vehicles are actuating. The processor is configured to select a set of N remote vehicles from the one or more remote vehicles based on the capability data, where the set of N remote vehicles consists of those remote vehicles of the one or more remote vehicles that are closest to the first vehicle, and the time slot of each of the remote vehicles in the set of N remote vehicles are different. Further, the processor is configured to divide a clock cycle into a plurality of time slots based on the set of N remote vehicles, and control, according to the plurality of time slots, sensor actuation of the sensor of the first vehicle sensor.

According to another aspect, a non-transitory computer-readable storage medium including instructions that when executed by a processor, cause the processor to establish an operable connection for computer communication between a first vehicle and one or more remote vehicles within a communication range of the first vehicle using a vehicular communication network. The first vehicle and the one or more remote vehicles are synchronized according to a global time signal. Further, the processor receives, from each of the one or more remote vehicles, capability data corresponding to the capabilities of sensors of each of the one or more remote vehicles. The capability data includes a sensor actuation time slot of each of the one or more remote vehicles indicting a time slot at which the sensors of each of the one or more remote vehicles are actuating. The processor selects a set of N remote vehicles from the one or more remote vehicles based on the capability data. The set of N remote vehicles consists of those remote vehicles of the one or more remote vehicles that are closest to the first vehicle and the time slot each of the remote vehicles in the set of N remote vehicles are different. The processor divides a clock cycle into a plurality of time slots based on the set of N remote vehicles, and controls, according to the plurality of time slots and the sensor actuation time slot, sensor actuation of a sensor of the first vehicle and the sensors of each of the remote vehicles in the set of N remote vehicles.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1A:
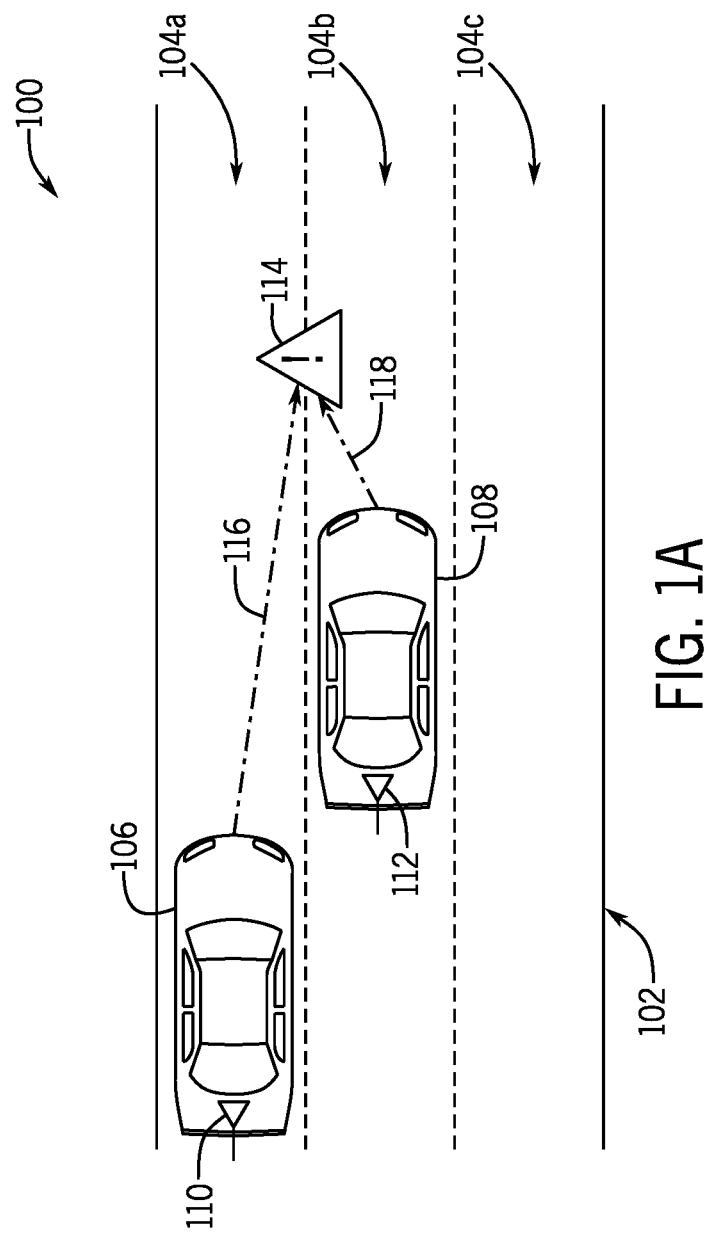
FIG. 1A is a schematic view of an exemplary traffic scenario implementing synchronized vehicle sensor data acquisition processing according to one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods described herein are generally directed to controlling actuation of sensors (e.g., triggering the activation of sensors) of a plurality of vehicles and controlling transmission of sensor data between each of the plurality of vehicles using a vehicle communication network. Synchronized actuation of the sensors and synchronized transmission of sensor data allows the plurality of vehicles to synergistically share relevant sensor information, that each vehicle alone may not be able to acquire and/or process. FIG. 1A illustrates an exemplary traffic scenario 100 implementing synchronized vehicle sensor data acquisition processing that will be used to describe some of the exemplary systems and exemplary methods herein. The traffic scenario 100 involves one or more vehicles on a roadway 102. The roadway 102 has a first lane 104a, a second lane 104b, and a third lane 104c. It is understood that the roadway 102 can have various configurations not shown in FIG. 1A, and can have any number of lanes.

In FIG. 1A, the traffic scenario 100 includes a first vehicle 106 and a second vehicle 108. In some embodiments, the first vehicle 106 can be referred to as a first vehicle (HV) and the second vehicle 108 can be referred to as a remote vehicle. In other embodiments, the first vehicle 106 can be referred to as an initiating vehicle that initiates the synchronization process described herein. However, it is understood that in other embodiments, the second vehicle 108 can be the initiating vehicle. In other embodiments, the first vehicle 106 can be referred to as a master vehicle and the second vehicle 108 can be referred to as a slave vehicle, or vice versa. Further, the first vehicle 106 and the second vehicle 108 can be referred to collectively as a plurality of vehicles. In some embodiments, the systems and methods discussed herein can be implemented with more than two vehicles. Also, it is understood that the first vehicle 106 and the second vehicle 108 can be in different configurations and positions other than those shown in FIG. 1A.

The first vehicle 106 and the second vehicle 108 can communicate as part of a vehicle communication network, which will be discussed in more detail herein with FIG. 1B. The vehicle communication described herein can be implemented using Dedicated Short Range Communications (DSRC). However, it is understood that the vehicle communication described herein can be implemented with any communication or network protocol, for example, ad hoc networks, wireless access within the vehicle, cellular networks, Wi-Fi networks (e.g., IEEE 802.11), Bluetooth, WAVE, CALM, Ultra Wideband, or any other form of wireless communication. Further, the vehicle communication network can be vehicle-to-vehicle (V2V) or a vehicle-to-everything (V2X).

In FIG. 1A, the first vehicle 106 can transmit, receive, and/or exchange communications including data, messages, images, and/or other information with other vehicles, user, or infrastructures, using DSRC. In particular, the first vehicle 106 is equipped with a vehicle-to-vehicle (V2V) transceiver 110 that can exchange messages and information with other vehicles, users, or infrastructures that are operable for computer communication with the first vehicle 106. For example, the V2V transceiver 110 can communicate with the second vehicle 108 via a V2V transceiver 112. As will be discussed herein, the first vehicle 106 and the second vehicle 108, using the V2V transceiver 110 and the V2V transceiver 112, can transmit sensor data to one another acquired by each respective vehicle.

In FIG. 1A, the first vehicle 106 and the second vehicle 108 are approaching a target 114. In some embodiments, the target 114 can be a hazard. The term hazard, or hazardous condition, can refer generally to one or more objects and/or driving scenarios that pose a potential safety threat to a vehicle. In some cases, the term hazard can be used to describe one or more hazardous driving conditions that increase the likelihood of an accident. For example, in FIG. 1A, the target 114 could be a pedestrian. In other embodiments, the target 114 could be debris located in the middle of the roadway 102. In some embodiments, the target 114 could be another vehicle that poses a threat to the first vehicle 106 and/or the second vehicle 108. It is understood that in some embodiments, the target 114 is not a hazard and does not necessarily present a hazardous condition or safety threat to the first vehicle 106 or the second vehicle 108. Instead, the target 114 could simply be part of an environment surrounding the first vehicle 106 and/or the second vehicle 108.

In FIG. 1A, the first vehicle 106 and the second vehicle 108 can "see" or observe the target 114 utilizing respective sensors, which will be discussed in further detail herein with FIG. 1B. As shown in FIG. 1A, the first vehicle 106 emits a sensor pulse 116 towards the target 114, which produces sensor data about the target 114 from the perspective of the first vehicle 106. Similarly, the second vehicle 108 emits a sensor pulse 118 towards the target 114, which produces sensor data about the target 114 from the perspective of the second vehicle 108. Thus, each vehicle "sees" and senses the target 114 from different perspectives (e.g., locations and angles), different times, and at different rates as required by the processing power of each vehicle and each sensor. As will be discussed herein, time synchronization of data capture and data transmission between the first vehicle 106 and the second vehicle 108 according to a global reference time frame, allows the first vehicle 106 and the second vehicle 108 to obtain useful sensor from each other according to accurate timing, that each vehicle alone may not be able to capture and/or process. Sensor data obtained in this way can provide an accurate means to control vehicle driving and/or vehicle systems.

Figure 1B:
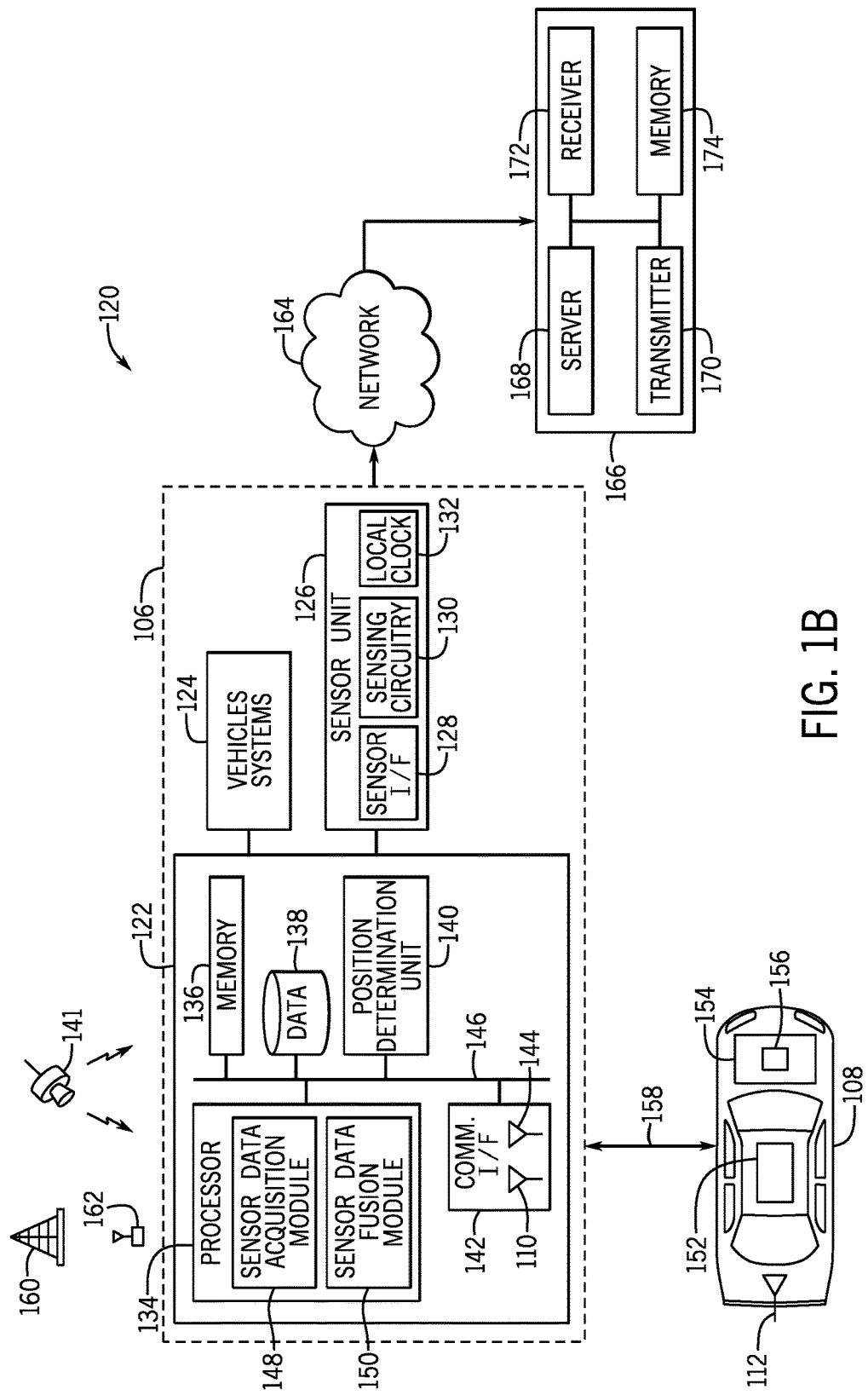
FIG. 1B is a schematic diagram of a vehicle communication network for implementing synchronized vehicle sensor data acquisition processing according to an exemplary embodiment.

Referring now to FIG. 1B, a vehicle communication network 120 for implementing synchronized vehicle sensor data acquisition processing according to an exemplary embodiment will be discussed in detail with reference to FIG. 1A. The components of the first vehicle 106 and the vehicle communication network 120, as well as the components of other systems, hardware architectures, and software architectures discussed herein, can be combined, omitted, or organized into different architectures for various embodiments. In FIG. 1B, the first vehicle 106 includes a vehicle computing device (VCD) 122, one or more vehicle systems 124, and a sensor unit 126. Generally, the VCD 122 includes a processor 134, a memory 136, a data store 138, a position determination unit 140, and a communication interface 142, which are each operably connected for computer communication via a bus 146 and/or other wired and wireless technologies. Some of the components shown in FIG. 1B with respect to the first vehicle 104 are not shown with respect the second vehicle 108. For simplicity, in FIG. 1B, the second vehicle 108 includes a processor 152, a sensor unit 154, and a local clock 156, which can include the same components and functionality discussed in detail with the first vehicle 104. It is understood that although not shown in FIG. 1B, one or more of the components of the first vehicle 106, can also be implemented with the second vehicle 108, or other vehicles discussed herein.

Referring again to the first vehicle 104, the VCD 122, can include provisions for processing, communicating and interacting with various components of the first vehicle 106 and other components of the vehicle communication network 120, including the second vehicle 108. In one embodiment, the VCD 122 can be implemented with the first vehicle 106, for example, as part of a telematics unit, a head unit, an infotainment unit, an electronic control unit, an on-board unit, or as part of a specific vehicle control system, among others. In other embodiments, the VCD 122 can be implemented remotely from the first vehicle 106, for example, with a portable device (not shown) or a device (e.g., remote processor/server) connected via the vehicle communication network 120.

The processor 134 can include logic circuitry with hardware, firmware, and software architecture frameworks for facilitating synchronized vehicle sensor data acquisition processing with the components of the VCD 122 and the vehicle communication network 120. Thus, in some embodiments, the processor 134 can store application frameworks, kernels, libraries, drivers, application program interfaces, among others, to execute and control hardware and functions discussed herein. For example, in FIG. 1B, the processor 134 can include a sensor data acquisition module 148 and sensor data fusion module 150. In some embodiments, the memory 136 and/or the data store (e.g., disk) 138 can store similar components as the processor 134 for execution by the processor 134.

The position determination unit 140 can include hardware (e.g., sensors) and software to determine a position (e.g., an absolute position and/or a relative position) of the first vehicle 106. For example, the position determination unit 140 can include a global positioning system (GPS) unit and/or an inertial measurement unit (IMU). In some embodiments, the position determination unit can be a navigation system that provides navigation maps and navigation information to the first vehicle 106. Thus, the position determination unit 140 can be any type of known, related or later developed navigational system. The phrase "navigation information" refers to any information that can be used to assist the first vehicle 106 in navigating a roadway or path. Navigation information may include traffic data, map data, and roadway classification information data. Navigation information can also include geographical information, including information obtained from any Global Navigational Satellite infrastructure (GNSS), including Global Positioning System or Satellite (GPS), Glonass (Russian) and/or Galileo (European). In particular, in FIG. 1B, the position determination unit 140 can obtain information from the global positioning source 141. As will be discussed herein, the position determination unit 140 can be used to localize the first vehicle 106 and/or the second vehicle 108.

The communication interface 142 can include software and hardware to facilitate data input and output between the components of the VCD 122 and other components of the vehicle communication network 120. Specifically, the communication interface 142 can include network interface controllers (not shown) and other hardware and software that manages and/or monitors connections and controls bi-directional data transfer between the communication interface 142 and other components of the vehicle communication network 120. More specifically, and as mentioned with FIG. 1A above, the VCD 122 can exchange vehicle data, including sensor data (e.g., from the sensor unit 126), with other DSRC compatible vehicles via the V2V transceiver 110. For example, the V2V transceiver 110 can exchange data with the second vehicle 108 via the V2V transceiver 112 using a communication link 158. Although only two vehicles are shown in FIG. 1B, it is understood that the first vehicle 106 can communicate with more than one vehicle configured for communication (e.g., DSRC) within the vehicle communication network 120. Thus, is some embodiments, communication links using DSRC can be established between the first vehicle 106 and a plurality of other vehicles (e.g., plurality of remote vehicles) configured for V2V communication using DSRC.

As will be discussed herein, various types of data can be communicated using the vehicle communication network. In some embodiments, data is communicated via DSRC by exchanging one or more basic safety messages (BSM). The BSM that is broadcast by a vehicle can contain a number of data elements that describe various aspects of the operation of the vehicle or provide information about the vehicle itself. For example, the type and/or specifications of the vehicle, navigation data, roadway hazard data, traffic location data, course heading data, course history data, projected course data, kinematic data, current vehicle position data, range or distance data, speed and acceleration data, location data, vehicle sensory data, vehicle subsystem data, and/or any other vehicle information. Some of the embodiments discussed herein include exchanging data and information between networked vehicles for use in vehicle driving.

In the embodiments discussed herein, synchronization of sensor data acquisition is executed based on information communicated between the first vehicle 106 and the second vehicle 108 using the communication link 158 established by DSRC. In other embodiments, the first vehicle 106 and the second vehicle 108 can exchange sensor data utilizing a wireless network antenna 160, roadside equipment (RSE) 162, a communication network 164, which can be a wireless communication network, or other wireless network connections.

Further, in some embodiments, synchronization of sensor data acquisition and data transmission can be executed at other infrastructures and servers, and data can be exchanged with other infrastructures and servers. For example, in FIG. 1B, the VCD 122 can transmit and receive information directly or indirectly to and from a service provider 166 over the communication network 164. The service provider 166 can include a remote server 168, a remote transmitter 170, a remote receiver 172, and a remote memory 174 that are configured to be in communication with one another. In FIG. 1B, the V2V transceiver 110 can be used by the VCD 122 to receive and transmit information to and from the service provider 166 and other servers, processors, and information providers through the communication network 164. In alternative embodiments, a radio frequency (RF) transceiver 144 in the first vehicle 106 can be used to receive and transmit information to and from the service provider 166. In some embodiments, the VCD 122 can receive and transmit information to and from the service provider 166 including, but not limited to, traffic data, vehicle location and heading data, high-traffic event schedules, weather data, or other transport related data. In some embodiments, the service provider 166 can be linked to multiple vehicles (e.g., the second vehicle 108) through a network connection, such as via the wireless network antenna 160, and/or other network connections.

Using the network configuration discussed above, the first vehicle 106 and the second vehicle 108 can coordinate actuation of sensors (e.g., trigger activation of sensors) and transmission of sensor data between one another. The sensing configuration will now be described in more detail with respect to the sensor unit 126, which can include a sensor interface 128, a sensing circuitry 130, and a local clock 132. As mentioned above, for simplicity, the second vehicle 108 includes the sensor unit 154 and the local clock 156, however, the second vehicle 108 can include one or more other components as discussed with the sensor unit 126 (e.g., a sensor interface, sensing circuitry). Although only one sensor unit 126 is shown with the first vehicle 104, It is understood that first vehicle 106 can include one or more sensor units and that each sensor unit can include one or more sensors (e.g., implemented by sensing circuitry 130). In some examples discussed herein, the sensor unit 126 is simply referred to as a sensor or sensors. In some embodiments, the sensor unit 126 can be associated with one or more of the vehicle systems 124.

With respect to the sensor unit 126, the sensor interface 128 interfaces with the sensing circuitry 130 to facilitate capture and processing of sensor data by the sensing circuitry 130. The VCD 122, using the processor 134, can control sensor actuation and acquire sensor data from the sensing circuitry 130 via the sensor interface 128. The sensing circuitry 130 can include various types of sensors for capturing various types of information (e.g., sensor data). For example, the sensing circuitry 130 can include vision sensors (e.g., cameras) for capturing image or video information. In other embodiments, the sensing circuitry 130 can include ranging sensors (e.g., LIDAR, RADAR) for capturing distance or speed information.

It is understood that the sensing circuitry 130 can include various types of sensors for use with the first vehicle 106 and/or the vehicle systems 124 for detecting and/or sensing a parameter of that system. Further, it is understood that the sensor unit 126 could be disposed in one or more portions of the first vehicle 106. For example, although not shown in FIG. 1B, the sensors could be integrated into a dashboard, seat, seat belt, door, bumper, front, rear, corners, dashboard, steering wheel, center console, roof or any other portion of the first vehicle 106. In other cases, however, the sensors could be portable sensors worn by a driver (not shown), integrated into a portable device (not shown), carried by the driver (not shown), integrated into an article of clothing (not shown) worn by the driver or integrated into the body of the driver (e.g. an implant) (not shown).

In some of the examples discussed with the systems and methods herein, the sensor unit 126 will be described as a vision sensor unit that includes one or more cameras that may be mounted on the first vehicle 106, for example, mounted on a windshield, a front dashboard, a grill, a rear-view mirror, among others. In other embodiments discussed herein, the sensor unit 126 can include ranging sensors. For example, a front long range RADAR and/or a front mid-range RADAR. The front long range RADAR can measure distance (e.g., lateral, longitudinal) and speed of objects surrounding the first vehicle 106. For example, the first long range RADAR can measure distance and speed of other vehicles (e.g., the second vehicle 108) and/or the target 114 surrounding the first vehicle 106. In other embodiments, the sensor unit 126 can include a plurality of RADARs in different location of the first vehicle 106. For example, a front left RADAR located at a front left corner area of the first vehicle 106, a front right RADAR located at a front right corner area of the first vehicle 106, a rear left RADAR located at a rear left corner area of the first vehicle 106, and a rear right RADAR located at a rear right corner area of the first vehicle 106.

Although vision sensors and ranging sensors are discussed throughout the examples herein, it is understood that other sensors can be implemented. Exemplary sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others. It is also understood that the sensor unit 126 can include sensors of any type, for example, acoustic, electric, environmental, optical, imaging, light, pressure, force, thermal, temperature, proximity, among others.

Furthermore, in some embodiments discussed herein, the sensor unit 126 can also include sensors classified as active sensors or passive sensors. An active sensor includes a transmitter that sends out a signal, light, electrons, among others, to be bounced off a target (e.g., the target 114), with data gathered by the sensor upon their reflection. Thus, active sensors transmit and detect energy at the same time. Illustrative examples of active sensors include, but are not limited to, LIDAR, RADAR, sonar, and infrared. A passive sensor detects and responds to some type of input from the physical environment. For example, passive sensors gather sensor data through the detection of vibrations, light, radiation, heat, among others. Illustrative examples of passive sensors include, but are not limited to, photographic (e.g., vision), thermal, electric field sensing, and infrared. It is understood that some types of sensors can be both active and passive sensors, for example, infrared sensors.

Referring again to FIG. 1B, the local clock 132 is a mechanism that controls timing of the instruction cycle of the sensing circuitry 130. Thus, the timing of actuation of the sensor unit 126 and/or the timing of the transmission of the sensor data captured by the sensor unit 126 is aligned with and controlled by the local clock 132. More specifically, the local clock 132 can generate a local clock signal as a reference timing signal for synchronizing capture of sensor data by actuation of the sensing circuitry 130. In some embodiments, the local clock 132 can be implemented within the processor 134. In other embodiments, the sensor unit 126 can have a dedicated processor with the local clock 132. In some embodiments, which will be discussed herein, the local clock 132 is based on an external timing signal (e.g., satellite based), for example, based on a pulse per second (PPS) signal received from the global positioning source 141. By using the PPS signal to align the local clock 132 signal, the timing of the local clock 132 is reliable and accurate. Furthermore, as will be discussed herein in further detail, by aligning the local clock 132 with the PPS signal from the global positioning source 141 and aligning the local clock 156 with the PPS signal from the global positioning source 141, the first vehicle 106 and the second vehicle 108 can control timing of sensor activation transmission of sensor data according to the same reference time signal (e.g., common time base). It is understood that in some embodiments, different types of times sources can be implemented other than PPS.

An illustrative example of sensor data capture using the sensor unit 126 will now be discussed. As mentioned above, the local clock 132 is synchronized with the global time signal (e.g., PPS signal) from the global positioning source 141. The processor 134 and/or the sensor interface 128 generates a number of sensor trigger pulses per clock cycle (i.e., per second according to the PPS signal). Each sensor trigger pulse actuates the sensing circuitry 130 (e.g., transmitting the sensor pulse 116) and thereby actuates capture of a data frame. The data frame is processed by the sensor unit 126 and/or the processor 134. After processing, and as will be discussed herein in more detail, the data frame can be transmitted, for example, to the second vehicle 108 Accordingly, a sensor trigger pulse controls the sensor unit 126 to capture a data frame of sensor data and process the data frame. This process, which can be referred to herein as a sensor data acquisition process, repeats for each sensor trigger pulse.

The sensor data acquisition process requires an amount of time (e.g., a sensor data acquisition process time) to execute. This amount of time can be based on the processing power of the processor 134 and/or the processing power of the sensor unit 126. Accordingly, the number of sensor trigger pulses per clock cycle and/or the number of data frames captured per clock cycle (i.e., data frame rate) can be limited based on the sensor data acquisition process time and/or the processing power. Thus, the first vehicle 106 can be limited in the granularity of sensor data it can capture and the type of sensor data it can capture. By controlling actuation of sensors for a plurality of vehicles, including the first vehicle 106 and the second vehicle 108, and sharing the resulting sensor data by controlling transmission of said sensor data, the first vehicle 106 and the second vehicle 108 can obtain useful sensor information, that each vehicle alone may not be able to capture and/or have the capability to process. Exemplary systems and methods for controlling actuation of sensors of a plurality of vehicles and controlling transmission of sensor data of a plurality of vehicles using the vehicle communication network 120 discussed above will now be described in more detail.

II. Maximum Time Synchronized Vehicle Sensor Data Acquisition Processing

Figure 2:
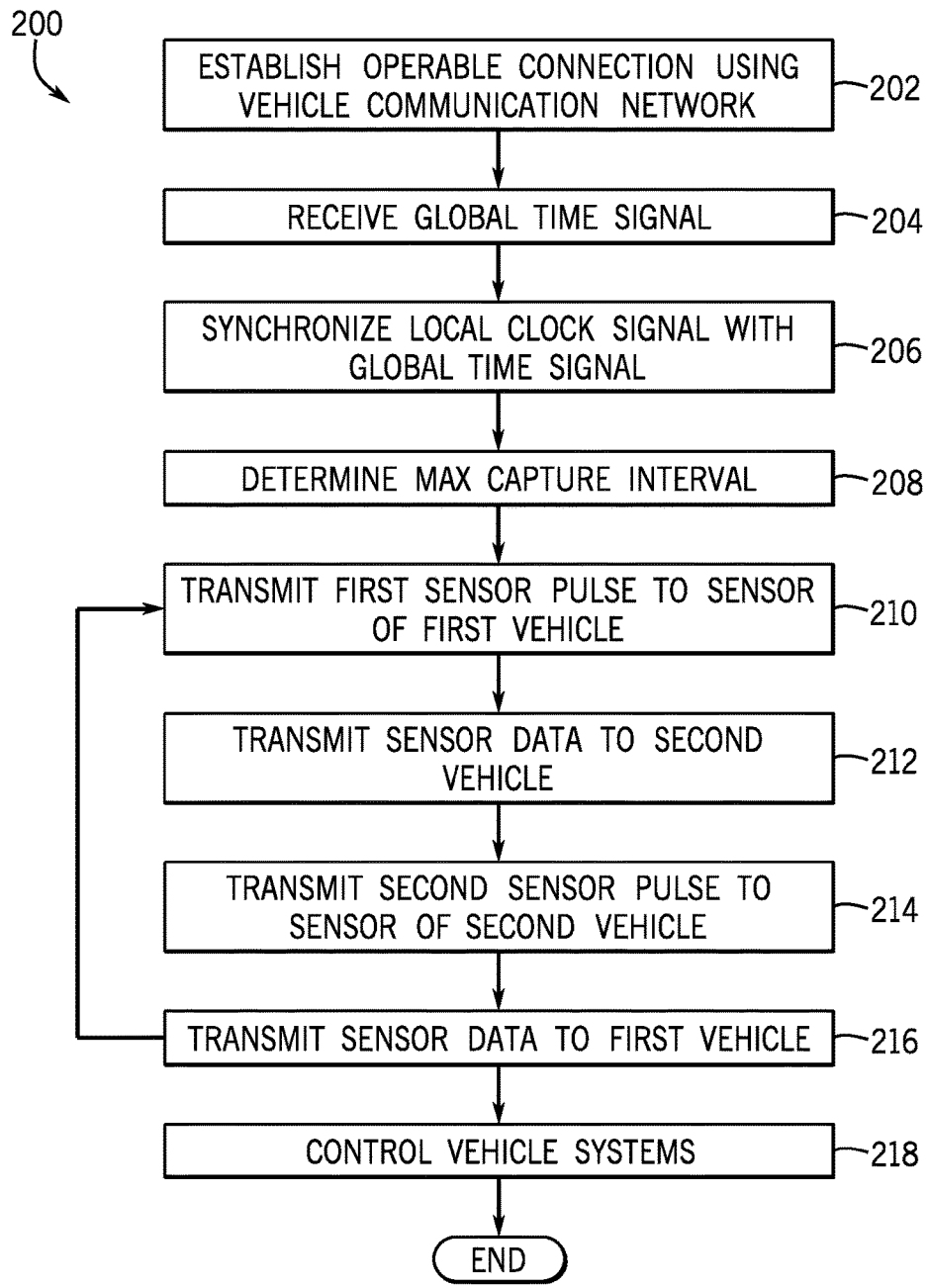
FIG. 2 is a process flow diagram of a method for synchronized vehicle sensor data acquisition processing using vehicular communication according to an exemplary embodiment.

In one embodiment, vehicle sensor data acquisition and vehicle sensor data transmission using vehicular communication is synchronized between more than one vehicle to maximize the time actuation of sensor data captured and processed by each vehicle. Referring now to FIG. 2, a method 200 for controlling vehicle sensor data acquisition using the vehicle communication network 120 will be discussed with reference to FIGS. 1A and 1B. At block 202, the method 200 includes, establishing an operable connection for computer communication between a first vehicle and a second vehicle using a vehicular communication network. For example, the communication interface 142 can establish a communication link 158 between the first vehicle 106 and the second vehicle 108. The communication link 158 can be established between V2V transceivers. For example, the V2V transceiver 110 can continuously search for signals from other V2V transceivers, such as by emitting a periodic signal that searches for a reply. In other embodiments, the V2V transceiver 110 may emit periodic signals searching for a reply from an in-range V2V transceiver. If a V2V transceiver replies (e.g., from the second vehicle 108), then the communication link 158 may be established.

In some embodiments, a communication link is established based on detecting a trigger event for time synchronized vehicle sensor data acquisition and processing. For example, the processor 134 can monitor the environment surrounding the first vehicle 106 and/or monitor data about the first vehicle 106 to detect a trigger event. In one embodiment, a trigger event is detected when the first vehicle 106 detects a hazardous condition, for example the target 114. A trigger event can be detected upon a particular sensor being actuated. In other embodiments, a trigger event can be detected upon detecting another vehicle within a predetermined proximity to the first vehicle 106 or within a communication range of the first vehicle 106. In this embodiment, the first vehicle 106 may identify other the vehicles within a communication range. Thus, an operable connection for computer communication can be made between each vehicle in a plurality of vehicles or between each vehicle in the plurality of vehicles and the first vehicle 106 using the vehicular communication network 120. In scenarios where the first vehicle 106 detects a trigger event, the first vehicle 106 may be considered an initiating vehicle and/or a master vehicle, that then establishes an operable connection for computer communication with other vehicles capable of V2V communication with the first vehicle 106. In other embodiments, the second vehicle 108 can detect the trigger event and initiate the operable connection. Further, it is understood that other types of trigger events other than those discussed herein can be contemplated.

Referring again to FIG. 2, at block 204, the method 200 includes, receiving a global time signal. For example, the processor 134 and/or the sensor data acquisition module 148 of the first vehicle 106 can receive a global time signal from a global receiver, for example, the global positioning source 141. As discussed above, in some embodiments, the global time signal is a pulse per second (PPS) signal. Similarly, the processor 152 of the second vehicle 108 can receive a global time signal from a global receiver, for example, the global positioning source 141. Again, in this embodiment, the global time signal is a PPS signal.

Accordingly, at block 206, the processor 134 and/or sensor data acquisition module 148 can synchronize a local clock signal (e.g., of the local clock 132) with the global time signal. Further, the processor 152 can synchronize a local clock signal (e.g., of the local clock 156) with the global time signal. Thus, each local clock of a plurality of vehicles can be synchronized according to the global time signal. By synchronizing the local clock 132 of the first vehicle 104 and the local clock 156 of the second vehicle 108, the timing of the instruction cycle of the first vehicle 106, namely, the sensor unit 126, and the second vehicle 108, namely, the sensor unit 154, will made with reference to the same global reference time base.

At block 208, the method 200 includes, determining a capture interval for a sensor data acquisition process time. A capture interval, as used within this description, is a period of time between actuation of the sensor unit 126 and actuation of the sensor unit 154. This can be a period of time between transmitting a sensor trigger pulse that actuates the sensor unit 126 and transmitting a sensor trigger pulse that actuates the sensor unit 154. Said differently, the capture interval is a period of time between a time a data frame is captured by the first vehicle 104 and a time a data frame is captured by the second vehicle 108. The capture interval is determined for a sensor data acquisition process time. Sensor data acquisition is the trigger process loop executed by the sensor including data capture and data processing for one data frame. Thus, the sensor data acquisition process time is the amount of time required to capture a data frame of sensor data and process the data frame.

Figure 3A:
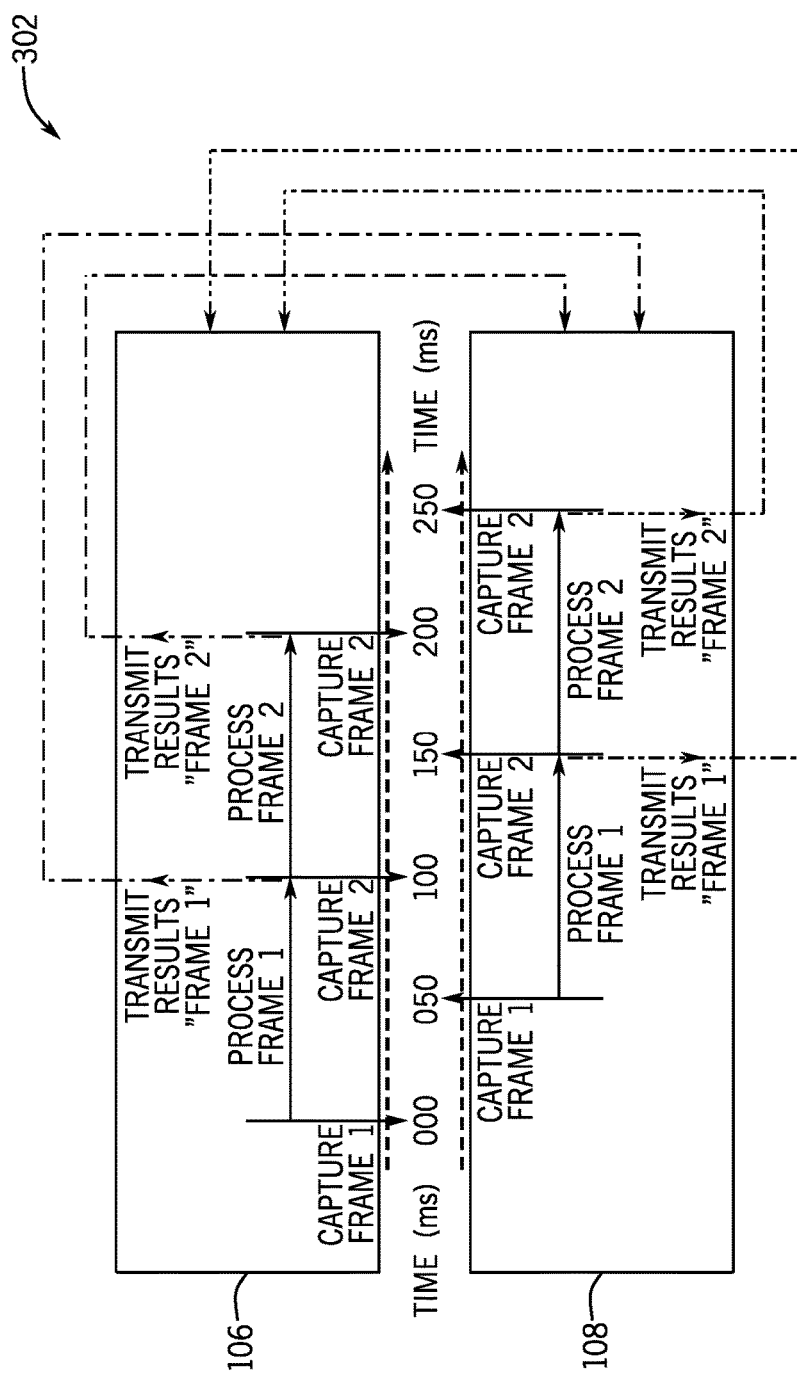
FIG. 3A is a schematic diagram illustrating f and processing of sensor data between a first vehicle and a second vehicle according to an exemplary embodiment.

As an illustrative example with reference to the diagram 302 shown in FIG. 3A, the sensor data acquisition process time for the first vehicle 106 is the time at the start of Capture Frame 1 (0 s) to the end of Process Frame 1 (100 ms). Thus, the sensor data acquisition process time is 100 ms. According to this sensor data acquisition process time, the first vehicle 106 can capture ten (10) frames in one (1) second or one clock cycle according to the local clock 132. Thus, the data frame rate the first vehicle 106 is capable of executing using its own sensor hardware is ten (10). As will be described herein, and as shown in FIG. 3A, by synchronizing timing of sensor activation and timing of sensor data transmission between more than one vehicle, a vehicle can realize an increased data frame rate and obtain useful sensor data from the perspectives of the other vehicles.

Figure 3B:
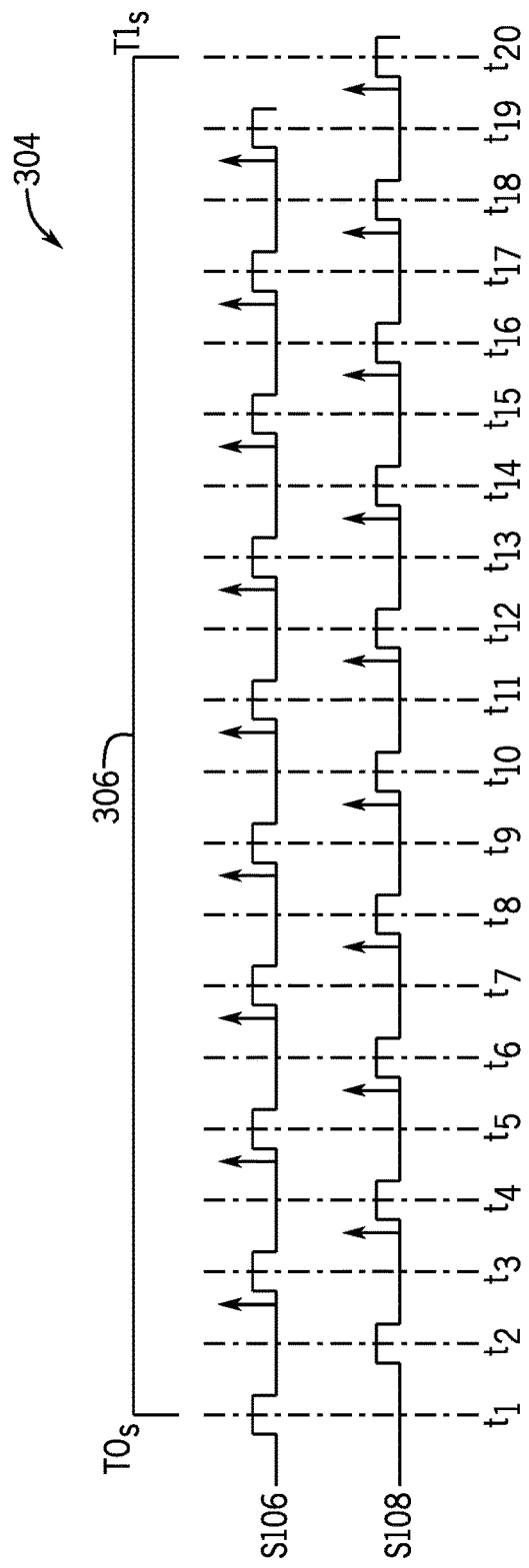
FIG. 3B is a schematic timing diagram of the maximum synchronization and processing of sensor data of FIG. 3A according to an exemplary embodiment.

As mentioned above, the processor 134 and/or the sensor data acquisition module 148 can determine and/or calculate the capture interval that maximizes a total number of data frames that can be captured by the sensor unit 126 of the first vehicle 106 and by the sensor unit 154 of the second vehicle 108. In other words, the capture interval maximizes a time between actuation of the sensor unit 126 of the first vehicle 106 and actuation of the sensor unit 154 of the second vehicle 108. As discussed above with FIG. 3A, the number of data frames that can be captured by the sensor unit 126 of the first vehicle 106 is ten (10), based on the sensor data acquisition process time of the first vehicle 106. The number of data frames that can be captured by the sensor unit 154 of the second vehicle 108 is ten (10), based on the sensor data acquisition process time of the second vehicle 108. Accordingly, the capture interval time is based on the total number of data frames that can be captured by the sensor unit 126 of the first vehicle 106 and by the sensor unit 154 of the second vehicle 108, namely, 20 data frames. Thus, in this embodiment, the capture interval time is 50 ms. As shown in FIG. 3A, the capture interval time is 50 ms between each capture by the first vehicle 107 and each capture by the second vehicle 108. This is also shown in FIG. 3B, over one clock cycle 306 (i.e., one (1) second), from T equals zero (0) seconds to one (1) second.

In a further embodiment, determining the capture interval for the sensor data acquisition process time that maximizes the total number of data frames is based on a number of vehicles within a predetermined distance from the first vehicle 104, or alternatively, the number of vehicles configured for operable computer communication via the vehicle communication network 120 to the first vehicle 104. Said differently, the capture interval maximizes a total number of data frames for capture by the sensors of the plurality of vehicles based on a number of the plurality of vehicles. For example, in one embodiment, at block 202 and/or at block 208, the first vehicle 104 can select one or more vehicles surrounding the first vehicle 104 to synchronize vehicle sensors data acquisition and transmission. In one embodiment, the first vehicle 104 can select one or more vehicles within a predetermined distance from the first vehicle 104, for example, within 300 m of the first vehicle 104. In another embodiment, the first vehicle 104 can select one or more vehicles based on a geoposition of the first vehicle 104, the one or more other vehicles, and/or the target 114. In another embodiment, determining the capture interval for the sensor data acquisition process time that maximizes the total number of data frames is based on a distance between the first vehicle 104 and the second vehicle 108. For example, the smaller the distance between the first vehicle 104 and the second vehicle 108, the larger the capture interval.

In one embodiment, at block 208, the method 200 optionally includes transmitting a message from the first vehicle 104 to the second vehicle 108, the message including the capture interval. In some embodiments, the message includes the capture interval and a start time for data acquisition of the sensor data from the sensor unit 154 of the second vehicle 108. Thus, the processor 134 and/or the processor 134 can set a start time for data acquisition of the sensor data from the sensor unit 154 of the second vehicle 108. The start time for data acquisition of the sensor data from the sensor unit 154 of the second vehicle 108 is offset by the capture interval from a start time for data acquisition of the sensor data from the sensor unit 126 of the first vehicle 104. As an illustrative example, FIG. 3B is a timing diagram 304 showing the capture intervals and actuation times for the first vehicle 106 and the second vehicle 108. A sensor trigger pulse activates the sensor unit 126 of the first vehicle 106 at $t_1$ (0 s) and a sensor trigger pulse activates the sensor unit 154 of the second vehicle 108 at $t_2$ (50 ms). Thus, the start time for data acquisition of the sensor data from the sensor unit 154 of the second vehicle 108 is offset by the capture interval from a start time for data acquisition of the sensor data from the sensor unit 126 of the first vehicle 104. In another embodiment, the method 200 can also include setting a start time for sensor data acquisition at each vehicle of the plurality of vehicles according to the local clock of each vehicle of the plurality of vehicles. Similar to the process described above, the start time for each vehicle is displaced from one another by the capture interval.

In some embodiments, at block 208, the method 200 can also include determining a transmission interval. A transmission interval, as used within this description, is a period of time between transmission and/or communication of sensor data from the sensor unit 126 to the second vehicle 108, and from the sensor unit 154 to the first vehicle 106. In other embodiments, the transmission interval can be a period of time from transmission of a sensor trigger pulse that actuates the sensor unit 126 and a period of time from transmission of a sensor trigger pulse that actuates the sensor unit 154. Said differently, in this embodiment, the transmission interval can be a period of time from when the sensor data is captured at the first vehicle 106 and/or at the second vehicle 108. For example, as shown in FIG. 3A, the first vehicle 106 captures frame 1 at 0 ms and transmits the results of frame 1 (e.g., after processing of frame 1) at 100 ms to the second vehicle 108. Similarly, the second vehicle 108 captures frame 1 at 50 ms and transmits the results of frame 1 (e.g., after processing of frame 1) at 150 ms to the first vehicle 106. In this embodiment, the transmission interval for the first vehicle 106 and the second vehicle 108 is 100 ms. In some embodiments, the transmission interval is based on the capture interval and a sensor data acquisition process time. Further, in some embodiments, the transmission interval is equal to the capture interval. Accordingly, in addition to synchronizing the timing of data capture, the timing of transmission of sensor data can also be synchronized between the first vehicle 106 and the second vehicle 108.

At block 210, the method 200 includes, transmitting and/or generating a first sensor trigger pulse according to the capture interval to the sensor of the first vehicle thereby triggering acquisition of sensor data from the sensor of the first vehicle. For example, the processor 134 and/or the sensor data acquisition module 148 can transmit a first sensor trigger pulse according to the capture interval to the sensor unit 126 of the first vehicle 104 thereby triggering acquisition of sensor data from the sensor unit 126 of the first vehicle 104. Said differently, the processor 134 can generate a first sensor trigger pulse according to the capture interval to the sensor unit 126 of the first vehicle 104 thereby triggering acquisition of sensor data from the sensor unit 126 of the first vehicle 104. For example, as shown in FIG. 3B, the sensor unit 126 of the first vehicle 106 is activated and captures sensor data at times: $t_1, t_3, t_5, t_7, t_9, t_{11}, t_{13}, t_{15}, t_{17}$, and $t_{19}$.

Therefore, at block 212, the first vehicle 104 (e.g., the processor 134 via the V2V transceiver 110) using the communication network 120 transmits the sensor data captured by the sensor unit 126 of the first vehicle 104 to the second vehicle 108. In some embodiments, the transmission of sensor data is executed according to the transmission interval. In FIG. 3B, the upward pointing arrows illustrate times at which the first vehicle 104 transmits the sensor data captured by the sensor unit 126 of the first vehicle 104 to the second vehicle 108. Accordingly, the transmission of the sensor data from the first vehicle 106 to the second vehicle 108 is also synchronized according to the global time signal.

At block 214, the method 200 includes, transmitting and/or generating a second sensor trigger pulse according to the capture interval to the sensor of the second vehicle. For example, the processor 134 (e.g., the sensor data acquisition module 138) and/or the processor 152 can transmit a second sensor trigger pulse according to the capture interval to the sensor unit 154 of the second vehicle 108, thereby triggering acquisition of sensor data from the sensor unit 154 of the second vehicle 108. In one embodiment, the second sensor trigger pulse is offset from the first sensor trigger pulse by the capture interval. For example, the processor 134 and/or the processor 152 transmits the second sensor trigger pulse at a time offset by the capture interval from a time the first sensor trigger pulse is transmitted. Said differently, transmitting the second sensor trigger pulse can include transmitting the second sensor trigger pulse at a time offset by the capture interval from the first sensor trigger pulse by the capture interval, thereby triggering acquisition of the sensor data from the sensor unit 154 of the second vehicle 108 at a time offset by the capture interval from the acquisition of the sensor data from the sensor unit 126 of the first vehicle 104. For example, as shown in FIG. 3B, the sensor unit 154 of the second vehicle 108 is activated and captures sensor data at times $t_2, t_4, t_6, t_8, t_{10}, t_{12}, t_{14}, t_{16}, t_{18}$, and $t_{20}$.

Accordingly, at block 216, the method 200 includes, the second vehicle 108 transmitting the sensor data from the sensor 154 of the second vehicle 108 to the first vehicle 106. Thus, the first vehicle 106 receives the sensor data from the second vehicle 108. As mentioned above, transmission of the sensor data can be based on the transmission interval. In FIG. 3B, the upward pointing arrows illustrate times at which the second vehicle 108 transmits the sensor data captured by the sensor unit 154 of the second vehicle 108 to the first vehicle 106. Accordingly, the transmission of the sensor data from the second vehicle 108 to the first vehicle 106 is also synchronized according to the global time signal.

In other embodiments, and as supported by the description of blocks 210, 212, 214, and 216 above, the method 200 includes alternately capturing, at times offset by the capture interval, sensor data from the sensors of the plurality of vehicles, where each vehicle of the plurality of vehicles transmits the sensor data to the other vehicles in the plurality of vehicles. For example, in FIG. 3B, the first vehicle 106 and the second vehicle 108 alternately capture sensor data at times offset by the capture interval. The first vehicle 106 captures at time $t_1$, the second vehicle 108 captures at time $t_2$, the first vehicle 106 captures at time $t_3$, the second vehicle 108 captures at time $t_4$, and so on.

Referring again to FIG. 2, at block 218, the method 200 includes, controlling the vehicle systems based in part, on the sensor data shared between the vehicles. For example, the processor 134 controls one or more vehicle systems 124 of the first vehicle 104 based on the sensor data from the sensor unit 126 of the first vehicle 104 and the sensor data from the sensor unit 154 of the second vehicle 108. In particular, in some embodiments, the sensor data fusion module 150 can use data fusion of the data captured by the first vehicle 106 and the data captured by the second vehicle 108 to control one or more of the vehicle systems 124. As will be discussed in detail herein, in one embodiment, controlling the vehicle systems 124 includes controlling localization of the first vehicle 106 and/or the second vehicle 108.

III. Minimum Time Synchronized Vehicle Sensor Data Acquisition Processing

Figure 4:
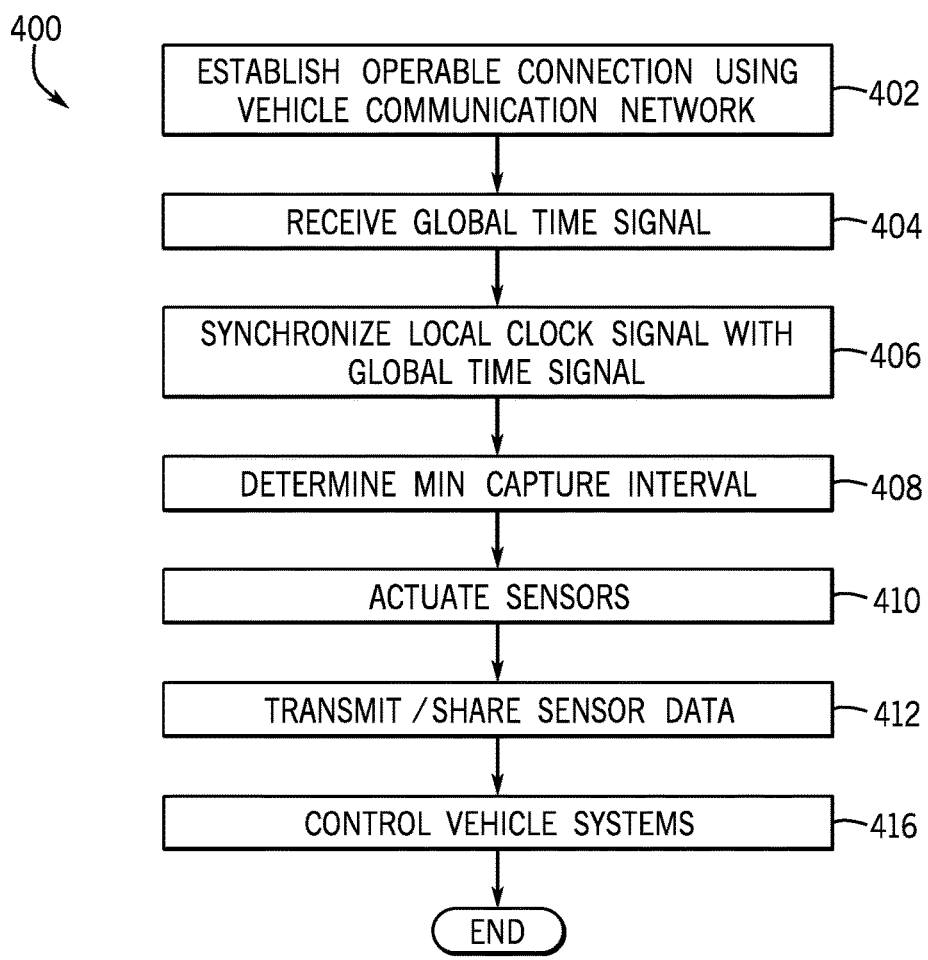
FIG. 4 is a process flow diagram of another method for synchronized vehicle sensor data acquisition processing using vehicular communication according to an exemplary embodiment.

As discussed above, vehicle sensor data acquisition and vehicle sensor data transmission using vehicular communication can be synchronized between more than one vehicle to maximize actuation of sensors captured by each vehicle. In other embodiments, which will now be discussed in more detail, vehicle sensor data acquisition and vehicle sensor data transmission using vehicular communication can be synchronized between more than one vehicle to minimize the time actuation of sensor data captured by each vehicle. Referring now to FIG. 4, a method 400 for controlling vehicle sensor data acquisition using a vehicular communication network with reference to FIGS. 1A, 1B, and 2 will be discussed. For simplicity, like numbered blocks in FIG. 4 are similar to like-numbered elements described in reference to FIG. 2.

Similar to block 202 of FIG. 2, the method 400 includes at block 402, establishing an operable connection for computer communication between a first vehicle and a second vehicle using a vehicular communication network. For example, as discussed with FIG. 2 in detail, a communication link 158 is established between the first vehicle 106 and the second vehicle 108. At block 404, the method 400 includes, receiving a global time signal. For example, as discussed in detail with FIG. 2, the processor 134 of the first vehicle 106 can receive a global time signal from the global positioning source 141, and the processor 152 of the second vehicle 108 can receive a global time signal from the global positioning source 141. Further, at block 406, the local clocks of each vehicle are synchronized with the global time signal. For example, as discussed in detail with FIG. 2, the processor 134 can synchronize a local clock signal (e.g., of the local clock 132) with the global time signal, and the processor 152 synchronize a local clock signal (e.g., of the local clock 156) with the global time signal. Accordingly, each vehicle is synchronized according to the same common time base and can actuate sensors and/or transmit sensor data based on the same common time base.

At block 408, the method 400 includes, determining a capture interval for a sensor data acquisition process. In this embodiment, the capture interval is determined and/or calculated to minimize a time between triggering actuation of the sensor unit 126 of the first vehicle 106 and the sensor unit 154 of the second vehicle 108. As discussed above in detail with FIG. 2, a capture interval, as used within this description, is a period of time between actuation of the sensor unit 126 and actuation of the sensor unit 154. This can be a period of time between transmitting a sensor trigger pulse that actuates the sensor unit 126 and transmitting a sensor trigger pulse that actuates of the sensor unit 154. Sensor data acquisition includes the trigger process loop executed by the sensor including data capture and data processing for one data frame. Thus, the sensor data acquisition process time is the amount of time required to capture a data frame of sensor data and process the data frame.

Figure 5A:
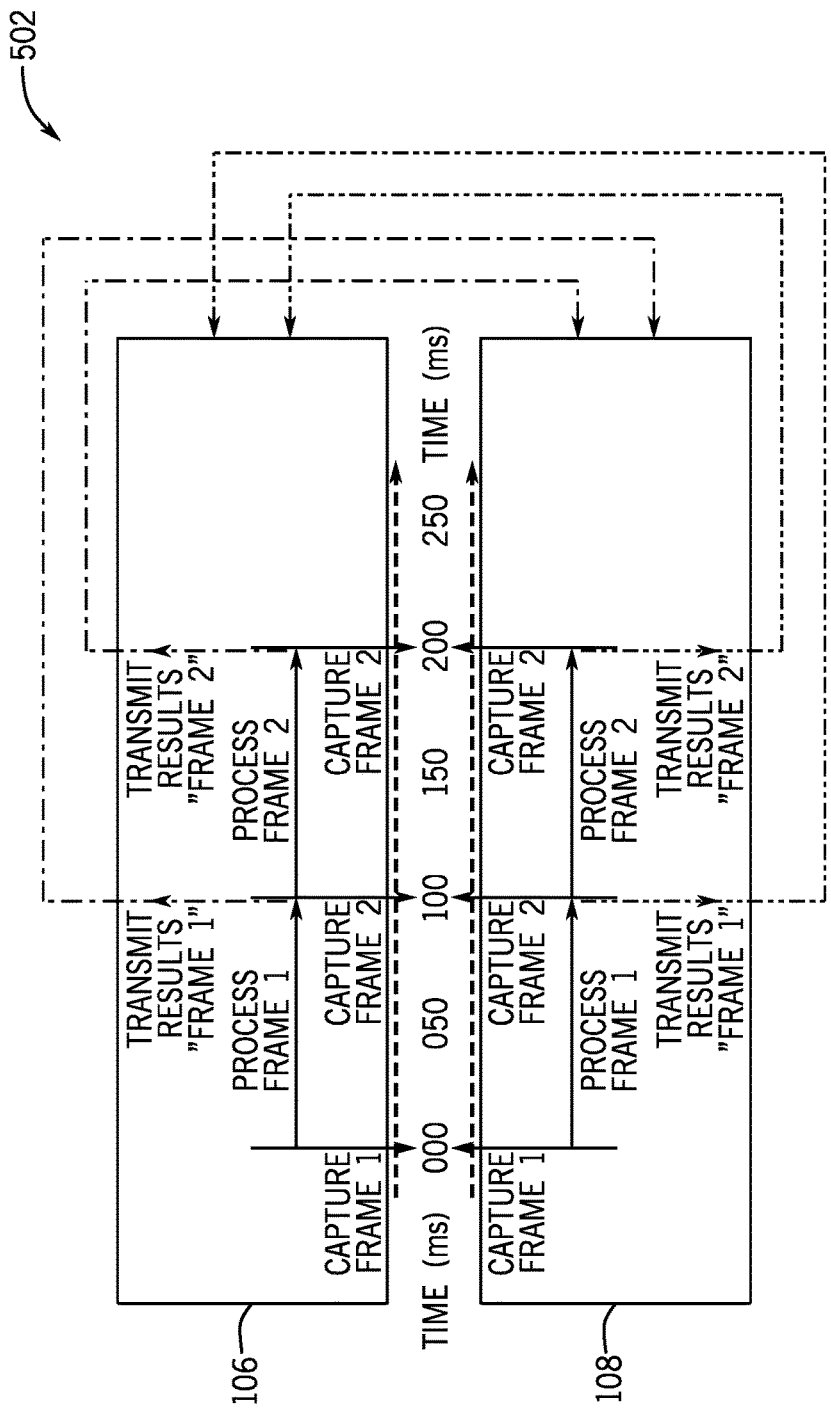
FIG. 5A is a schematic diagram illustrating minimum synchronization and processing of sensor data between a first vehicle and a second vehicle according to an exemplary embodiment.

In one embodiment, the capture interval is determined and/or calculated to minimize the time between the actuation of the sensor unit 126 of the first vehicle 106 and the sensor unit 154 of the second vehicle 108, so that the actuation of the sensor unit 126 of the first vehicle 106 is at substantially the same time as the actuation the sensor unit 154 of the second vehicle 108 according to the capture interval. Thus, in some embodiments, the capture interval is determined to minimize the time to zero (0) between triggering actuation of the sensor unit 126 of the first vehicle 106 and the sensor unit 154 of the second vehicle 108. As an illustrative example with reference to the diagram 502 shown in FIG. 5A, the sensor data acquisition process time for the first vehicle 106 is the time at the start of Capture Frame 1 (0 ms) to the end of Process Frame 1 (100 ms). According to this sensor data acquisition process time (i.e., 100 ms), the first vehicle 106 can capture ten (10) frames in one (1) second or one clock cycle according to the local clock 132. Accordingly, to minimize the time between actuation of the sensor unit 126 and the sensor unit 154, the capture interval time is 100 ms. As shown in FIG. 5A, the first vehicle 106 and the second vehicle 108 capture a data frame of sensor data at substantially the same time, every 100 ms according to the capture interval.

In some embodiments, the capture interval minimizes the time between the actuation of the sensor unit 126 of the first vehicle 106 and the sensor unit 154 of the second vehicle 108 within a predetermined tolerance threshold (e.g., a predetermined number of milliseconds). Further, as discussed above with FIG. 2, in some embodiments, the capture interval and/or the predetermined tolerance threshold can be based on a number of vehicles within a predetermined distance from the first vehicle 104, a number of vehicles configured for operable computer communication via the vehicle communication network 120 to the first vehicle 104, a distance between the first vehicle 104 and the second vehicle 108, among others.

As discussed above with FIG. 2, block 208, in some embodiments, the first vehicle 106 and/or the second vehicle 108 can determine a transmission interval. A transmission interval, as used within this description, is a period of time between transmission and/or communication of sensor data from the sensor unit 126 to the second vehicle 108, and from the sensor unit 154 to the first vehicle 106. In other embodiments, the transmission interval can be a period of time from transmission of a sensor trigger pulse that actuates the sensor unit 126 and a period of time from transmission of a sensor trigger pulse that actuates the sensor unit 154. Said differently, in this embodiment, the transmission interval can be a period of time from when the sensor data is captured at the first vehicle 106 and/or at the second vehicle 108. For example, as shown in FIG. 5A, the first vehicle 106 captures frame 1 at 0 ms and transmits the results of frame 1 (e.g., after processing of frame 1) at 100 ms to the second vehicle 108. Similarly, the second vehicle 108 captures frame 1 at 0 ms and transmits the results of frame 1 (e.g., after processing of frame 1) at 100 ms to the first vehicle 106. In this embodiment, the transmission interval for the first vehicle 106 and the second vehicle 108 is 100 ms. Thus, the transmission interval can be substantially the same for the first vehicle 106 and the second vehicle 108. In some embodiments, the transmission interval is based on the capture interval and a sensor data acquisition process time. Further, in some embodiments, the transmission interval is equal to the capture interval. Accordingly, in addition to synchronizing the timing of data capture, the timing of transmission of sensor data can also be synchronized between the first vehicle 106 and the second vehicle 108.

Figure 5B:
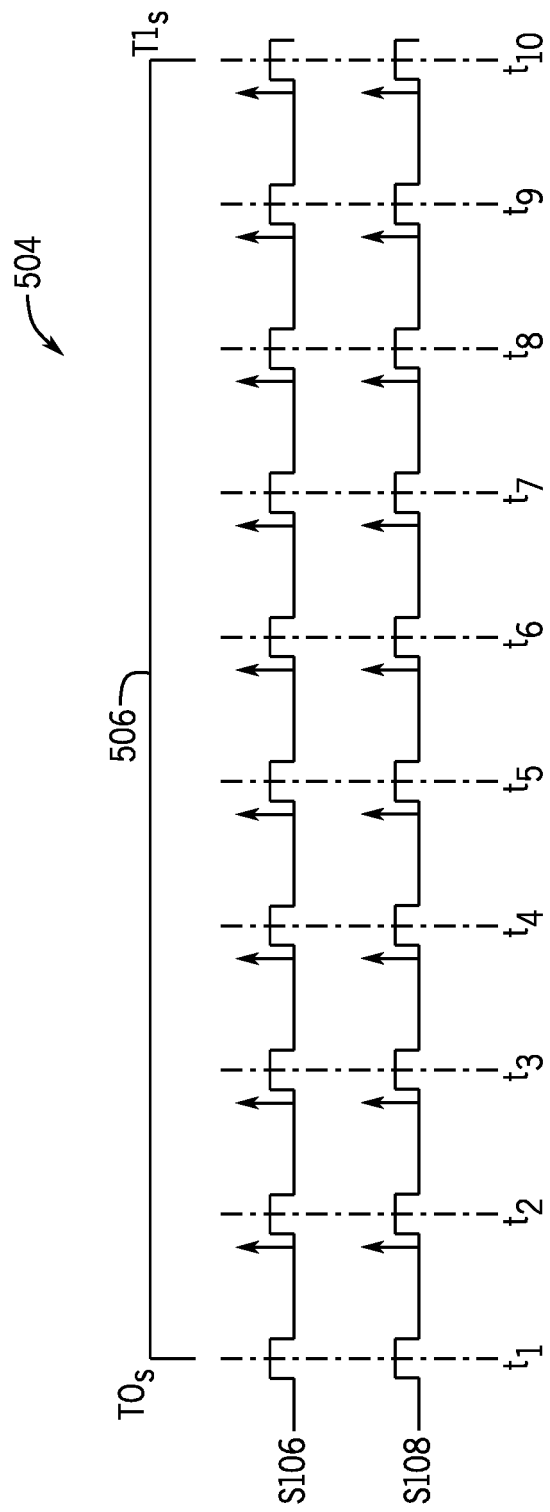
FIG. 5B is a schematic timing diagram of the minimum synchronization and processing of sensor data of FIG. 5A according to an exemplary embodiment.

Referring again to FIG. 4, at block 410, the method 400 includes actuating, according to the capture interval, the sensor unit 126 of the first vehicle 106 to capture sensor data from the sensor unit 126 of the first vehicle 106 and actuating the sensor unit 154 of the second vehicle 108 to capture sensor data from the sensor unit 154 of the second vehicle 108. According to the capture interval, and as discussed above with block 402, actuation of the sensor unit 126 of the first vehicle 106 and the sensor unit 154 of the second vehicle 108 is executed so that the sensor data from the sensor unit 126 and the sensor data from the sensor unit 154 are captured at substantially the same time. For example, as shown in FIG. 5B, the sensor unit 126 of the first vehicle 106 and the sensor unit 154 of the second vehicle 108 are activated and capture sensor data at times: $t_1$, $t_2$, $t_3$, $t_4$, $t_5$, $t_6$, $t_7$, $t_8$, $t_9$, and $t_{10}$.

Further, at block 412, the method 400 includes, sharing the sensor data between the first vehicle 106 and the second vehicle 108. More specifically, the first vehicle 106 transmits to the second vehicle 108 the sensor data from the sensor unit 126 of the first vehicle 106 acquired by the actuation of the sensor unit 126 of the first vehicle 106 (e.g., at block 404), and the second vehicle 108 transmits to the first vehicle 106 the sensor data from the sensor unit 154 of the second vehicle 108 by the actuation of the sensor unit 154 of the second vehicle 108 (e.g., at block 404). In this embodiment, the transmission of data is executed at substantially the same time. For example, as shown in FIG. 5A, the first vehicle 106 Transmit Results "Frame 1" at substantially the same time (i.e., 100 ms) as the second vehicle 108 Transmit Results "Frame 1." This is also shown in FIG. 5B, where upward pointing arrows illustrate times at which the second vehicle 108 transmits the sensor data captured by the sensor unit 154 of the second vehicle 108 to the first vehicle 106, and. As discussed above, in some embodiments, sharing the sensor data between the first vehicle 106 and the second vehicle 108 can be executed according to a transmission interval. By exchanging sensor data, the first vehicle 104 and the second vehicle 108 have realized a data frame rate greater than the data frame rate each vehicle is capable of achieving alone.

Further, at block 416 the method 400 includes, controlling the vehicle systems based, in part, on the sensor data shared between the vehicles. As discussed above in detail with FIG. 2, the processor 134 controls one or more vehicle systems 124 of the first vehicle 104 based on the sensor data from the sensor unit 126 of the first vehicle 104 and the sensor data from the sensor unit 154 of the second vehicle 108. In one embodiment, which will now be discussed in greater detail, controlling the vehicle systems 124 includes localizing positions of the first vehicle 106 and/or the second vehicle 108.

IV. Time Synchronized Vehicle Sensor Data Acquisition Processing for Localization In one embodiment, time synchronization of data acquisition processing as described above can be used to improve localization techniques. Accurate localization techniques are particularly helpful in urban areas or other areas where satellite positioning (e.g., GPS systems) performs poorly. For example, position data from GPS systems can have large errors and variances. Further, because GPS systems require an unobstructed view to satellites, inclement weather, urban regions, mountainous terrain, among others, pose challenges to vehicle localization. Co-operative localization using vehicular communication using the systems and methods described above can help vehicles determine their own positions and the positions of other vehicles more accurately.

Figure 6A:
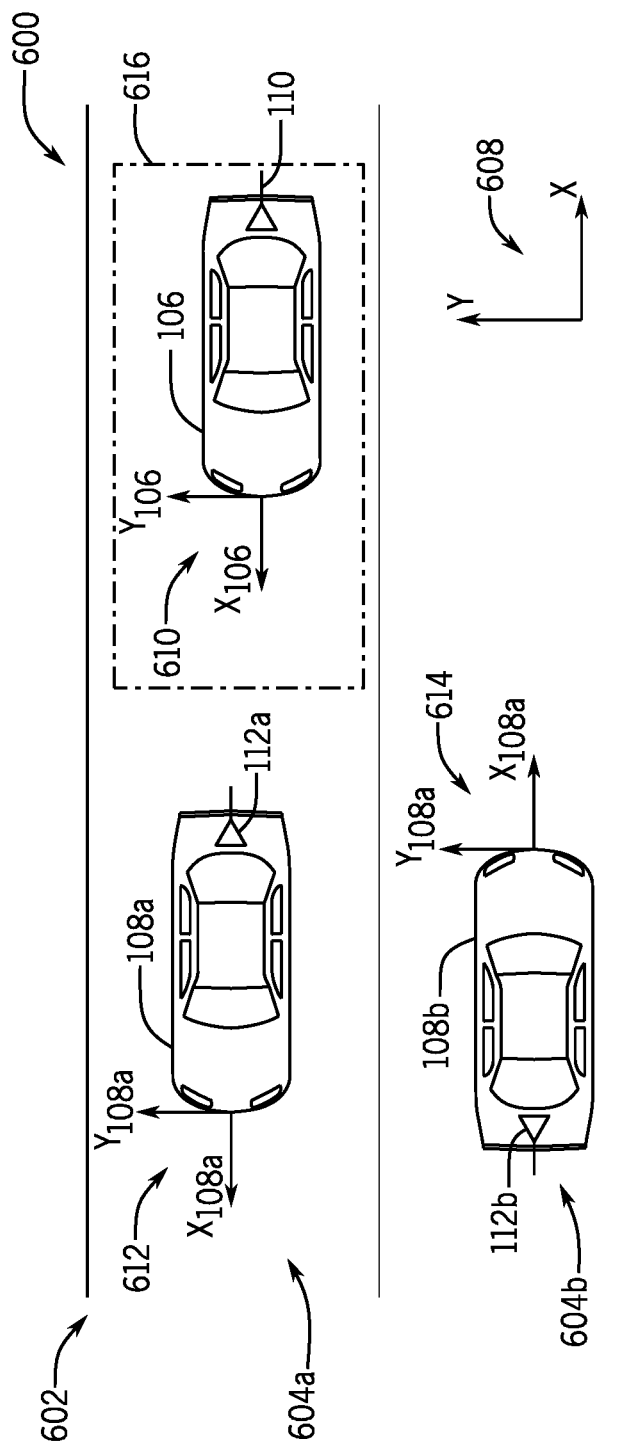
FIG. 6A is a schematic view of an exemplary traffic scenario implementing synchronized vehicle sensor data acquisition processing for localization according to one embodiment.

An illustrative example of co-operative localization using time synchronized vehicle sensor data acquisition is shown in FIG. 6A. For simplicity, like numerals and like named elements in FIG. 6A are similar to like-numbered and like-named elements described in FIGS. 1A and 1B. Additionally, it is understood that although not shown, FIG. 6A can include one or more components shown in FIGS. 1A and 1B. A traffic scenario 600 includes a first vehicle 106 and other vehicles, namely, a second vehicle 108a travelling in the same lane (i.e., the lane 604b) and ahead of the first vehicle 106, and a third vehicle 108b travelling in an adjacent lane (i.e., the lane 604c) and in an opposite flow of traffic of the lane 604b (i.e., in a direction towards the first vehicle 106). Each of the vehicles shown in FIG. 6 are operable for V2V computer communication with each other using DSRC via V2V transceivers 110, 112a, and 112b. Similar to the vehicles described with FIGS. 1A and 1B, each vehicle shown in FIG. 6 can "see" or observe other vehicles on the roadway utilizing respective sensors. For example, the first vehicle 106 can include sensors that detect a position and/or a distance to the second vehicle 108a and/or the third vehicle 108b. The second vehicle 108a can include sensors that detect a position and/or a distance to the first vehicle 106 and/or the third vehicle 108b. Similarly, the third vehicle 18b can include sensors that detect a position and/or a distance to the first vehicle 106 and/or the second vehicle 108a. Additionally, using V2V communication, each vehicle can share position information about itself and/or other vehicles.

Each vehicle can be defined in space in an absolute position (i.e., global reference frame) and a relative position (i.e., local reference frame). In FIG. 6A, the first vehicle 106 has an absolute position defined by a global reference frame 608 that is earth-fixed ($X_n$, $Y_n$). The position determination unit 140 can determine the absolute position of the first vehicle 106 based on information from the global positioning source 141 and/or based on information (e.g., wheel speed, acceleration) from an inertial measurement unit or one or more of the vehicle systems 124. The first vehicle 106 also has a relative position defined by its own coordinate frame, namely, a first vehicle coordinate frame 610 ($X^{106}$, $Y^{106}$). When the first vehicle 106 detects the second vehicle 108a and/or the third vehicle 108b, the first vehicle 106 can determine relative positions of the second vehicle 108a and/or the third vehicle 108b relative to the first vehicle 106 in the first vehicle coordinate frame 610. Similarly, the second vehicle has a second vehicle coordinate frame 612 ($X_{108a}$, $Y_{108a}$), and the third vehicle has a third vehicle coordinate frame 614 ($X_{108b}$, $Y_{108b}$). It is understood that although the local reference frame of each vehicle in FIG. 6A is determined with respect to a center point at the front of each vehicle, in other embodiments, the local reference frame can be initialized at different locations. Accordingly, each vehicle can estimate its own position using its own absolute position according to the global reference frame 608 and/or its relative positions with other vehicles according to its own coordinate frame. By exchanging local position data and relative position data using the time synchronization methods discussed above, each vehicle can update its own position estimate to self-localize itself and localize other vehicles and/or targets.

For example, the first vehicle 106 can determine an estimate of its own position. In FIG. 6A, the first vehicle 106 determines an estimate of its own position as within a target area 616. As will be discussed herein, the first vehicle 106 exchanges position data with the second vehicle 108a via DSRC. Based on the relative position data from the second vehicle 108a, the first vehicle 106 can refine the estimate of its own position. For example, based on the relative position data from the second vehicle 108a, the first vehicle 106 may determine a refined position estimate within a reduced area (not shown) of the target area 616. This position estimate and target area 616 can be further refined with relative position data from the third vehicle 108b. In some embodiments, which will be discussed herein, the first vehicle 106 can also confirm and/or compare position data from other vehicles and selectively choose which position data to use in order to refine its own position estimate.

Accordingly, localization can be improved by sharing local position data and relative position data among a plurality of vehicles. The capture and transmission of said data can be synchronized according to a common time base, as discussed above, to further improve localization. For example, in the embodiments described above with respect to FIGS. 4, 5A, and 5B, each vehicle actuates sensors at substantially the same time. However, the sensor data from each vehicle differs because each vehicle obtains sensor data at substantially the same time from different perspectives based on the position and/or orientation of each vehicle. For example, as discussed above with FIG. 6A, the first vehicle 106 can obtain position data about the second vehicle 108a and/or the third vehicle 108b according to its own relative reference frame 610. The second vehicle 108a can obtain position data about the first vehicle 106 and/or the third vehicle 108b according to its own relative reference frame 612, and so on. Sensor data, including position data, taken at substantially the same time, but from different perspectives, can provide useful information for localization. The examples discussed herein with respect to localization refer to time synchronization of data acquisition processing according to FIGS. 4, 5A, and 5B (i.e., minimum time synchronized vehicle sensor data acquisition processing). However, it is understood that in other embodiments, time synchronization of data acquisition processing according to other embodiments discussed herein (e.g., maximum time synchronized vehicle sensor data acquisition processing) can be implemented.

Figure 6B:
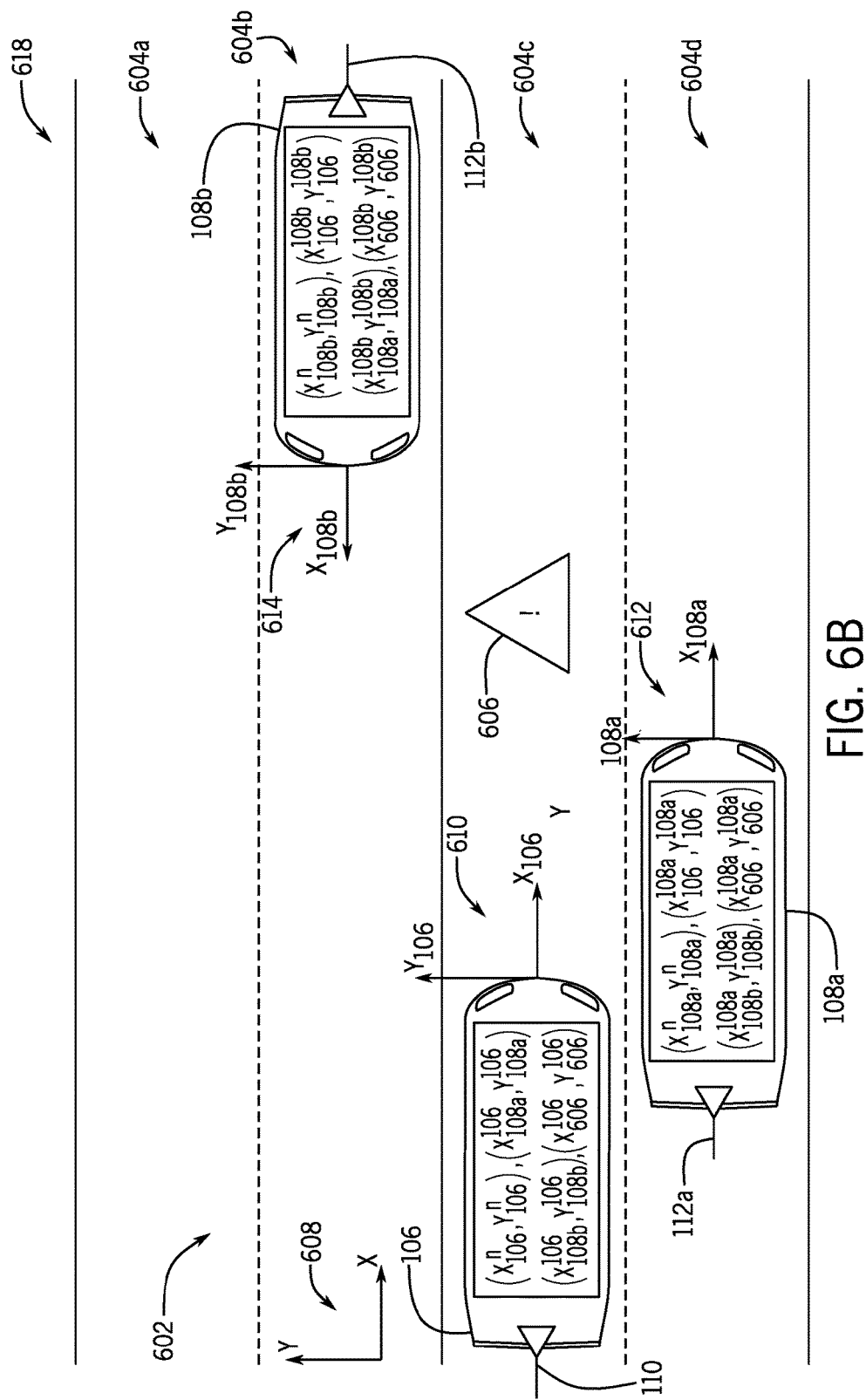
FIG. 6B is a schematic view of an exemplary traffic scenario including a target and implementing synchronized vehicle sensor data acquisition processing for localization according to one embodiment.

Localization will now be discussed in more detail with reference to FIG. 6B. FIG. 6B is exemplary traffic scenario 618 for localization using synchronized vehicle sensor data acquisition according to an exemplary embodiment, similar to FIG. 6A, but including a target 606. For simplicity, like numerals and like named elements in FIGS. 6A and 6B are similar to like-numbered and like-named elements described in FIGS. 1A and 1B. Additionally, it is understood that although not shown, FIG. 6B can include one or more components shown in FIGS. 1A, 1B, and 6A. In FIG. 6B, a first vehicle 106 and other vehicles, namely, a second vehicle 108a and a third vehicle 108b, are approaching a target 606. Each of the vehicles shown in FIG. 6B are operable for V2V computer communication with each other using DSRC via V2V transceivers 110, 112a, and 112b. Similar to the vehicles described with FIGS. 1A, 1B, and 6A, each vehicle shown in FIG. 6B can "see" or observe the target 606 utilizing respective sensors. In some embodiments, the respective sensors can also observe other vehicles on the roadway 602. For example, the first vehicle 106 can include sensors that detect a position and/or a distance to the second vehicle 108a and/or the third vehicle 108b. The second vehicle 108a can include sensors that detect a position and/or a distance to the first vehicle 106 and/or the third vehicle 108b. Similarly, the third vehicle 18b can include sensors that detect a position and/or a distance to the first vehicle 106 and/or the second vehicle 108a. Additionally, using V2V communication, each vehicle can share position information about itself and/or other vehicles.

Each vehicle can be defined in space in an absolute position (i.e., global reference frame) and a relative position (i.e., local reference frame). In FIG. 6B, the first vehicle 106 has an absolute position defined by a global reference frame 608 that is earth-fixed ($X_n$, $Y_n$). The position determination unit 140 can determine the absolute position of the first vehicle 106 based on information from the global positioning source 141 and/or based on information (e.g., wheel speed, acceleration) from an inertial measurement unit or one or more of the vehicle systems 124. The first vehicle 106 also has a relative position defined by its own coordinate frame, namely, a first vehicle coordinate frame 610 ($X^{106}$, $Y^{106}$). When the first vehicle 106 detects the second vehicle 108a, the third vehicle 108b, and/or the target 606, the first vehicle 106 can determine relative positions of the second vehicle 108a, the third vehicle 108b, and/or the target 606 relative to the first vehicle 106 in the first vehicle coordinate frame 610. Similarly, the second vehicle has a second vehicle coordinate frame 612 ($X_{108a}$, $Y_{108a}$) and the third vehicle has a third vehicle coordinate frame 614 ($X_{108b}$, $Y_{108b}$). It is understood that although the local reference frame of each vehicle in FIG. 6B is determined with respect to a center point at the front of each vehicle, in other embodiments, the local reference frame can be initialized at different locations. Accordingly, each vehicle can estimate its own position using its own absolute position according to the global reference frame 608 and/or its relative positions with other vehicles according to its own coordinate frame. By exchanging local position data and relative position data using the time synchronization methods discussed above, each vehicle can update its own position estimate to self-localize itself and localize other vehicles and/or targets.

Figure 7:
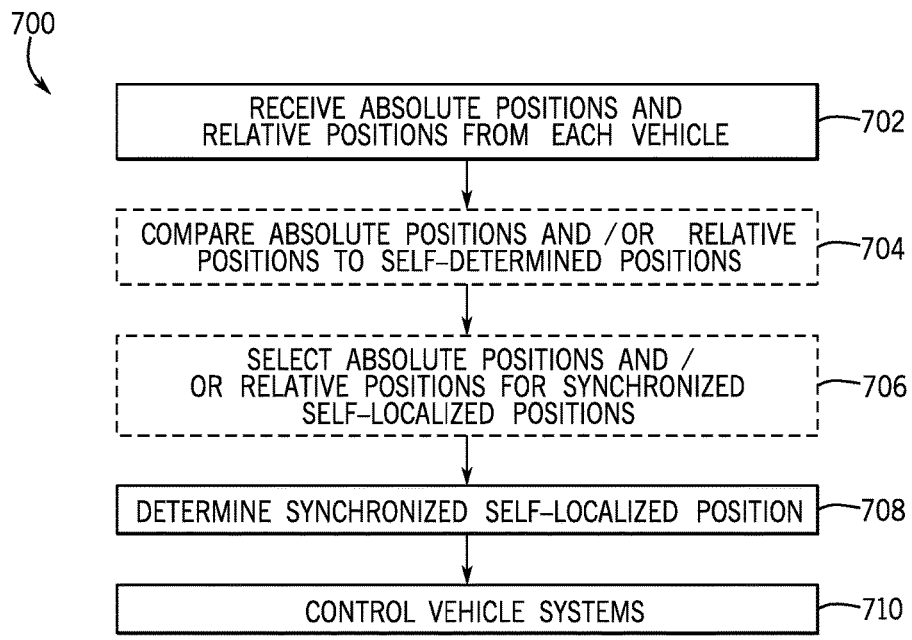
FIG. 7 is a process flow diagram of a method for synchronized vehicle sensor data acquisition processing for localization according to an exemplary embodiment.

With reference to FIG. 7, a method 700 for localization using synchronized vehicle sensor data acquisition will be described. It is understood that in some embodiments, one or more of the components of the method 700 can be omitted, reorganized, and/or integrated with the methods 200 and 400 discussed herein. For simplicity, the method 700 will be described with reference to the method 400. Accordingly, at block 702, the method 700 can include receiving a geoposition (e.g., a global position) of each vehicle and/or a relative position of each vehicle. In some embodiments, a geoposition of each vehicle may not be available, for example, because access to the global positioning source 141 is obstructed. With reference to block 406 of FIG. 4, sharing sensor data by transmitting sensor data acquired by actuation of each sensor at substantially the same time (e.g., at block 404), can include sharing a global position of the transmitting vehicle, a relative position of the receiving vehicle, a relative position of a target, and/or a relative position of each of the other vehicles sharing sensor data.

Thus, in one embodiment, the first vehicle 106 transmits first vehicle position data to the second vehicle 108a, the first vehicle position data including a geoposition of the first vehicle 106 ($X''_{106}$, $Y''_{106}$) and a relative position of the second vehicle 108a ($X^{106}_{108a}$, $Y^{106}_{108a}$) based on the sensor data from the sensor unit 126 of the first vehicle 106. In some embodiments, the first vehicle 106 can also transmit a relative position of the target 606 ($X^{106}_{606}$, $Y^{106}_{606}$), and a relative position of the third vehicle 108b ($X^{106}_{108b}$, $Y^{106}_{108b}$). Further, the second vehicle 108a transmits second vehicle position data to the first vehicle 106, the second vehicle 108a position data including a geoposition of the second vehicle 108a ($X''_{108a}$, $Y''_{108a}$) and a relative position of the first vehicle 106 ($X^{108a}_{106}$, $Y^{108a}_{106}$) with the sensor data from the sensor unit 154 of the second vehicle 108a. In some embodiments, the second vehicle 108a can also transmit a relative position of the target 606 ($X^{108a}_{604}$, $Y^{108a}_{604}$) and a relative position of the third vehicle 108b ($X^{108a}_{108b}$, $Y^{108a}_{108b}$). Similarly, the third vehicle 108b can transmit a geoposition of the third vehicle 108b ($X''_{108b}$, $Y''_{108b}$), a relative position of the first vehicle 106 ($X^{108b}_{106}$, $Y^{108b}_{106}$), a relative position of the second vehicle 108a ($X^{108b}_{108a}$, $Y^{108b}_{108a}$), and a relative position of the target 606 ($X^{108b}_{604}$, $Y^{108b}_{604}$) to the first vehicle 106 and/or the second vehicle 108a.

Using the shared position information, each vehicle can perform localization of itself, other vehicles, and/or the target 606 at block 708. More specifically, at block 704, the method 700 can optionally include comparing self-determined positions to received relative positions and/or received gepositions. For example, the first vehicle 106 can compare its self-geoposition, the geoposition (i.e., absolute position) of the first vehicle 106 ($X''_{106}$, $Y''_{106}$), with the relative position of the first vehicle 106 ($X^{108a}_{106}$, $Y^{108a}_{106}$) as seen from the second vehicle 108a, the relative position of the first vehicle 106 ($X^{108b}_{106}$, $Y^{108b}_{106}$) as seen from the third vehicle 108b, the geoposition of the second vehicle 108a ($X''_{108a}$, $Y''_{108a}$) transmitted by the second vehicle 108a, and/or the geoposition of the third vehicle 108b ($X''_{108b}$, $Y''_{108b}$) transmitted by the third vehicle 108b. In some embodiments, the first vehicle 106 can compare its self-geoposition and/or a relative position of the target 606 as seen from its self ($X^{106}_{606}$, $Y^{106}_{606}$), with the relative positions of the target 606 as seen from and transmitted by the second vehicle 108a ($X^{108a}_{606}$, $Y^{108a}_{606}$), and the third vehicle 108b ($X^{108b}_{606}$, $Y^{108b}_{606}$). Based on these comparisons, the first vehicle 106 can determine a self-localized position of the first vehicle 106, a localized position of the second vehicle 108a, a localized position of the third vehicle 108b, and/or a localized position of the target 606, at block 708. The determination and/or calculation of these localized positions can be performed using triangulation, trilateration, dead reckoning, among others.

In one embodiment, at block 706, the relative positions used for comparison at block 704 or used to calculate the localized positions at block 708, can be selected from the relative positions received from the other vehicles. For example, when each data frame of sensor data is received (e.g., at block 406), the first vehicle 106 can identify relative positions from the relative positions transmitted by the second vehicle 108a and/or the third vehicle 108b, for use in the localization determination at block 708. For example, the first vehicle 106 can identify relative positions based on a tolerance level. In other embodiments, the first vehicle 106 can assign a confidence level to each relative position for use in the localization determination at block 708. In this embodiment, the confidence level can be based on a distance between the first vehicle 106 and the vehicle the relative position is received from. In other embodiments, the confidence level can be based on an error threshold from the absolute position of the first vehicle 106 and/or a relative position of the first vehicle 106 determined by the first vehicle 106.

Further, at block 710, the method 700 includes, controlling the vehicle systems based, in part, on the self-localized positions determined at block 708. For example, the position determination unit 140 can use the self-localized positions for navigation purposes. In other embodiments, advanced driver assistance systems can use the self-localized positions for anti-collision purposes. Based on the above method and system, position data from multiple vehicles where the sensors are actuated at substantially the same time from a common global time reference, can be fused to provide accurate localization.

V. Avoiding Sensor Interference with Synchronized Vehicle Sensor Data

As shown in the illustrative examples of FIGS. 1A and 6A, multiple vehicles can be operating (e.g., actuating) sensors at the same time within the same physical location. In the case of active sensors, which emit energy in the form of laser or radio waves, increasing use of these sensors at the same time by vehicles within the same physical location can cause interference problems. Sensor interference creates inaccurate measurements, which can lead to inaccurate vehicle system control. Wireless vehicle communication can be used to synchronize sensor actuation to address sensor interference issues. Accordingly, in the methods and systems discussed herein, multiple vehicles within a particular area can use time multiplexing to set a time slot to actuate sensors of the multiple vehicles, and thereby minimize interference between the actuation of the sensors (e.g., transmission of laser and/or radio raves) from the multiple vehicles.

Figure 8:
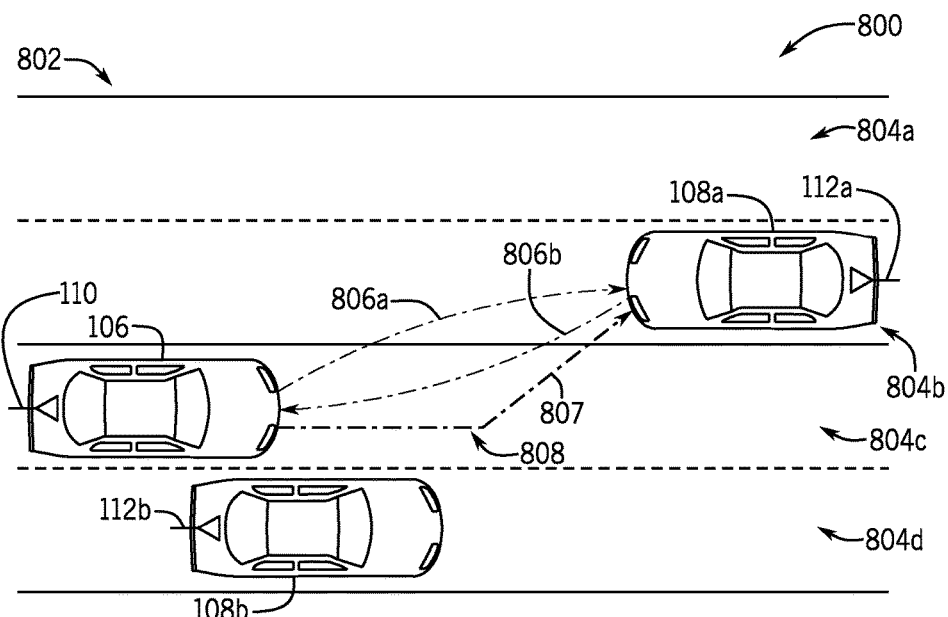
FIG. 8 is a schematic view of an exemplary traffic scenario implementing time synchronized sensor data acquisition for sensor non-interference according to an exemplary embodiment.

As an illustrative example, FIG. 8 is a traffic scenario 800 for time synchronized sensor data acquisition for sensor non-interference according to an exemplary embodiment. For simplicity, like numerals and like named elements in FIG. 8 are similar to like-numbered and like-named elements described in FIGS. 1A and 1B. Additionally, it is understood that although not shown, FIG. 8 can include one or more components shown in FIGS. 1A and 1B. In FIG. 8, a first vehicle 106 and a second vehicle 108a are approaching one another from opposite directions on a roadway 802. Further, a third vehicle 108b is moving in the same direction as the first vehicle 106, in a lane 804*d* adjacent to the lane 804*c* in which the host vehicle 106 is travelling. Each of the vehicles shown in FIG. 8 are operable for V2V computer communication with each other using DSRC via transceivers 110, 112*a*, and 112*b*. In this example, the first vehicle 106 transmits a sensor pulse 806*a* (e.g., actuates the sensor unit 126) into the surrounding environment towards the second vehicle 108*a*, and a reflected sensor pulse 806*b* is detected by the first vehicle 106, without interference. The first vehicle 106 also transmits a sensor pulse 807 into the surrounding environment, however, the sensor pulse 807 bounces off the ground at point 808 towards the second vehicle 108*a*. This interference (i.e., reflection off the ground) can lead to a false measurement at the second vehicle 108*a*. Accordingly, V2V communication and synchronization can be implemented to synchronize the sensor firing among vehicles within a particular range (e.g., communication range).

Figure 9:
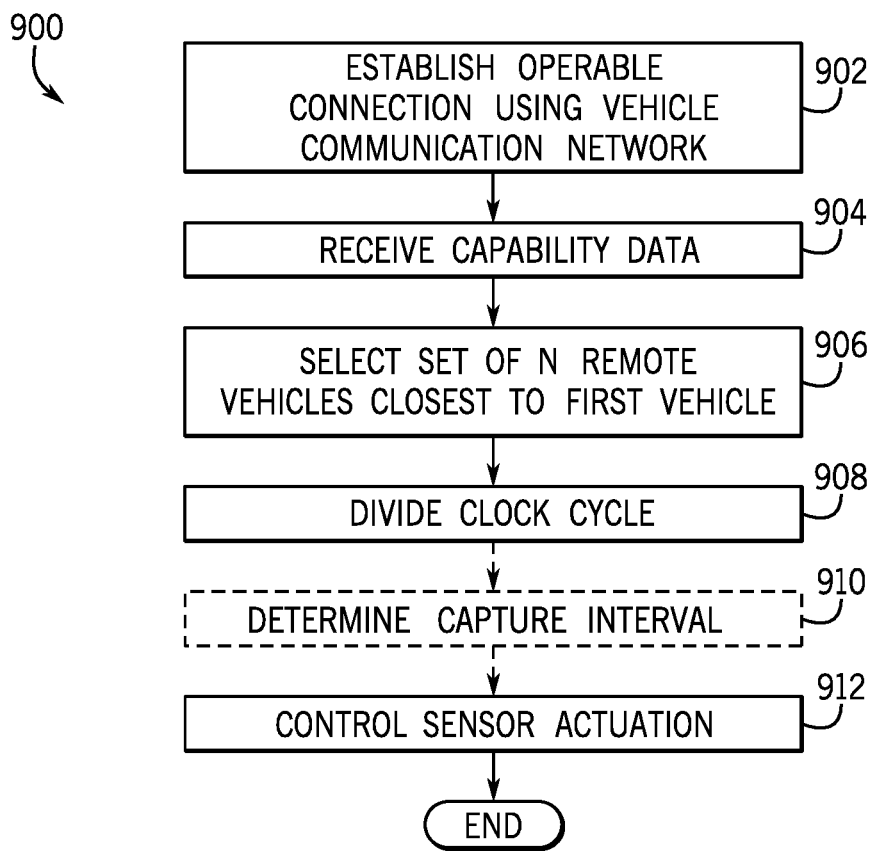
FIG. 9 is a process flow diagram of a method for controlling sensor data acquisition using a vehicular communication network for sensor non-interference according to an exemplary embodiment.

Referring now to FIG. 9, a method 900 for controlling sensor data acquisition using a vehicular communication network for sensor non-interference will be discussed with further reference to FIGS. 1A, 1B, 2, and 8. For simplicity, like numbered elements in FIG. 9 are similar to like-numbered elements described in reference to FIGS. 2 and/or 4. It is understood that in some embodiments, one or more of the components of the method 900 can be omitted, reorganized, and/or integrated with the methods 200, 400, and 700 discussed herein. Similar to block 202 of FIG. 2, the method 900 includes at block 902, establishing an operable connection for computer communication between a first vehicle one or more remote vehicles within a communication range of the first vehicle using the vehicular communication network. For example, as discussed with FIG. 2 in detail, a communication link 158 is established between the first vehicle 106 and the second vehicle 108.

The first vehicle 106 and the remote vehicles 108 operate based upon a common time base according to a global time signal. For example, as discussed in detail with FIG. 2, the processor 134 of the first vehicle 106 can receive a global time signal from the global positioning source 141, and the processor 134 of the second vehicle 108 can receive a global time signal from the global positioning source 141. Further, as discussed above, the processor 134 can synchronize a local clock signal (e.g., of the local clock 132) with the global time signal, and the processor 134 can synchronize a local clock signal (e.g., of the local clock 156) with the global time signal. Accordingly, each vehicle is synchronized according to the same common time base and can actuate sensors based on the same common time base.

Figure 10A:
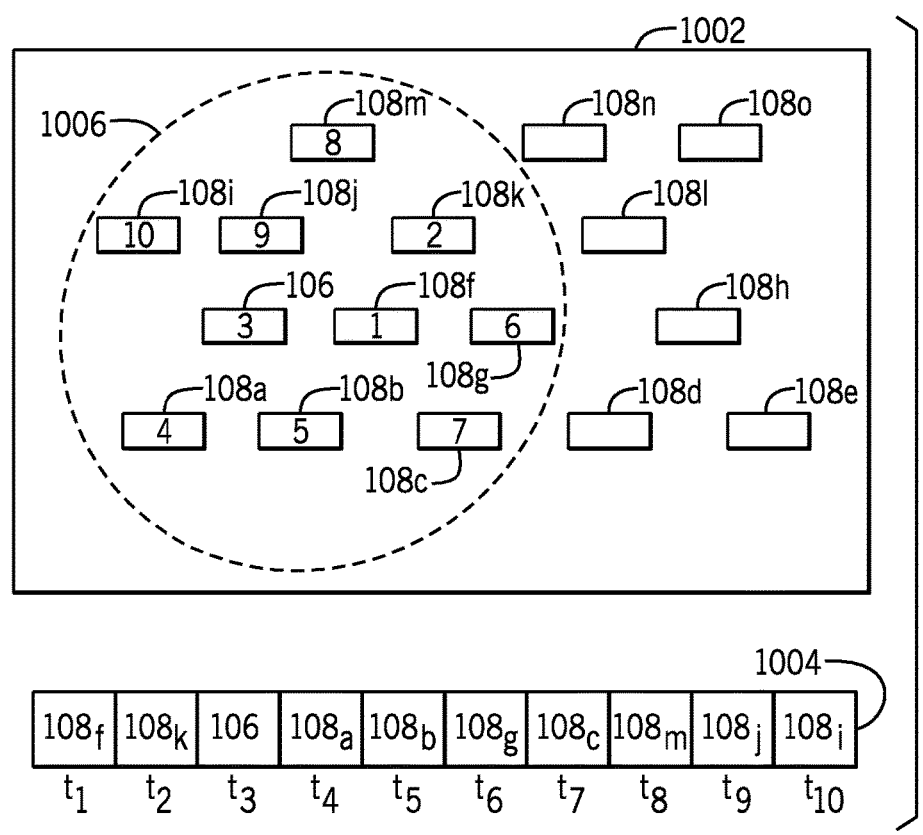
FIG. 10A is a schematic diagram of an illustrative example of remote vehicles within a communication range, a set of N remote vehicles, and a data frame based on the set of N remote vehicles according to an exemplary embodiment.
Figure 10B:
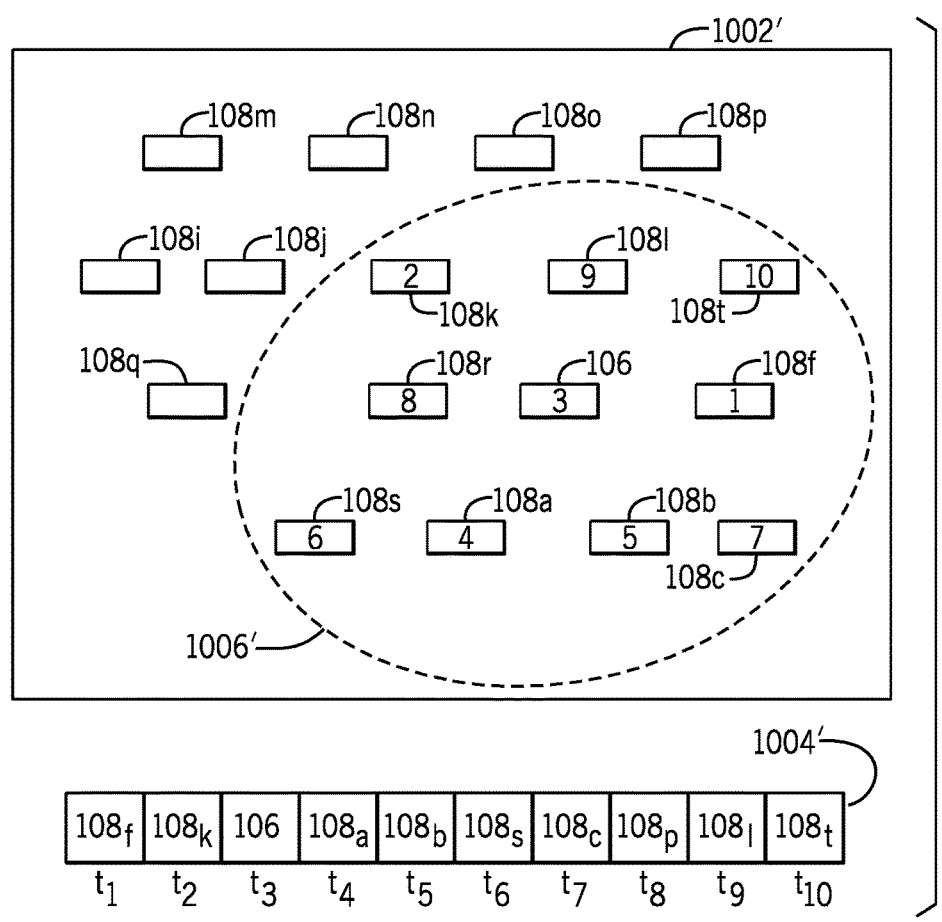
FIG. 10B is a schematic diagram of the illustrative example shown in FIG. 10A updated based on remote vehicles within a communication range, a set of N remote vehicles, and a data frame based on the set of N remote vehicles according to an exemplary embodiment.

Referring now to FIGS. 10A and 10B, a schematic diagram of exemplary remote vehicles 108 within a communication range 1002 of a first vehicle 106 (e.g., host vehicle) is shown. As discussed herein, the communication range 1002 of the first vehicle 106 is dynamic since the communication range 1002 changes as the first vehicle 106 moves. The communication range can also be referred to as a transmission range. In one illustrative embodiment, the communication range of the first vehicle 106 is 300 m from the first vehicle 106 (e.g., 300 m from a transceiver of the first vehicle 106). In FIG. 10A, each of the remote vehicles 108*a*-108*o* are within a communication range 1002 of the first vehicle 106. Further, the first vehicle 106 and the remote vehicles 108*a*-108*o* are all configured for operable computer communication via the vehicle communication network 120 according to the communication range 1002. Accordingly, the first vehicle 106 is operable to establish a communication link with any of the remote vehicles 108*a*-108*o*. Thus, the first vehicle 106 can exchange information with any of the remote vehicles 108*a*-108*o* within the communication range 1002.

In FIG. 10B, the communication range 1002' has changed (e.g., as the first vehicle 106 and the remote vehicles 108 move). In FIG. 10B, remote vehicles 108*p*, 108*q*, 108*r*, 108*s*, and 108*t* are now within the communication range 1002' of the first vehicle 106. Accordingly, the first vehicle 106 is now operable to establish a communication link with the remote vehicles 108*p*, 108*q*, 108*r*, 108*s*, and 108*t*. The remote vehicles 108*d*, 108*e*, 108*g*, and 108*h* were within the communication range 1002, but are no longer within the communication range 1002'. Accordingly, the first vehicle 106 is not operable to establish a communication link with the remote vehicles 108*d*, 108*e*, 108*g*, and 108*h*. It is understood that communication ranges and the ability to communicate with moving vehicles is dynamic. Thus, the method and systems discussed herein for real time synchronization of sensor actuation adapt to this dynamic nature.

As discussed above with FIG. 2, in some embodiments, a communication link is established based on detecting a trigger event for time synchronized vehicle sensor data acquisition and processing. More specifically, with respect to method 900 and as shown in FIGS. 10A and 10B, the remote vehicles 108 that are operable for computer communication with the first vehicle 106 dynamically change in real time. This is because the communication range 1002 of the first vehicle 106 and the remote vehicle 108 constantly changes as the first vehicle 106 and the remote vehicles 108 move. Additionally, the communication range 1002 itself may change because of obstructions and/or connectivity issues. In some embodiments, which will be discussed in further detail herein, block 902 is continuously executing in parallel with other blocks of the method 900. Therefore, in addition to establishing operable connections with remote vehicles 108 within the communication range, operable connections are also terminated with remote vehicles 108 who are no longer within the communication range 1002. Thus, the remote vehicles 108 are constantly changing and the set of N remote vehicles (e.g., at block 906) can be continuously updated based on the first vehicle 106 establishing a new communication link with remote vehicles 108, analyzing capability data from the remote vehicles 108 (e.g., at block 904), and/or the first vehicle 106 terminating an existing communication link with the remote vehicles 108.

Referring again to FIG. 9, at block 904, the method 900 includes receiving, from each of the one or more remote vehicles, capability data. The capability data corresponds to the capabilities of sensors of each of the one or more remote vehicles. Said differently, the capability data is specification data about a sensor unit 154 that each remote vehicle 108 is configured to utilize. For example, capability data can include, but is not limited to, a type of sensor, a range of the sensor, a processing speed of the sensor, a location of the sensor, and a sensor actuation time slot. The sensor actuation time slot indicates a time or a time slot (e.g., according to the common time base) at which the sensor is actuating. This can be a time slot at which the remote vehicle 108 emits a sensor trigger pulse which actuates sensing circuitry of the sensor unit 154. It is understood that the capability data can be communicated using the vehicle communication network. Also, other data can be communicated in addition to the capability data, for example, location data (e.g., a geoposition) of the remote vehicles 108. It is understood that in addition to the capability data discussed above, any type of data can be communicated between the first vehicle 106 and the remote vehicles 108 via DSRC as described herein.

Referring again to FIG. 9, at block 906, the method 900 includes selecting a set of N remote vehicles from the one or more remote vehicles based on the capability data. For example, with respect to FIG. 10A, the processor 134 can select one or more of the remote vehicles 108 in the communication range 1002 to include in a set of N remote vehicles 1006 based on the capability data. In FIG. 10A, the set of N remote vehicles 1006 includes the remote vehicles 108a, 108b, 108c, 108f, 108g, 108i, 108j, 108k, and 108m. In some embodiments, the number (i.e., N) of remote vehicles 108 in the set of N remote vehicles 1006 can be predetermined. For example, in some embodiments, N may be set to ten (10) remote vehicles 108. In some embodiments, the number of remote vehicles 108 in the set of N remote vehicles 1006 is based on a number of times slots that a clock cycle is divided into, for example, based on a capture time interval (e.g., blocks 908, 910). Further, it is understood that the number of remote vehicles in the set of N remote vehicles 1006 can include the first vehicle 106. Thus, in FIGS. 10A and 10B, the number of remote vehicles in the set of N remote vehicles 1006 including the host vehicle 106 is ten (10).

In one embodiment, the set of N remote vehicles 1006 consists of those remote vehicles 108 of the one or more remote vehicles 108 within the communication range 1002 of the first vehicle 106 that are closest to the first vehicle 106. For example, as shown in FIG. 10A, the remote vehicle 108g is closer to the first vehicle 106 than the remote vehicle 108h. Thus, the remote vehicle 108g is included within the set of N remote vehicle 1006.

It is understood that determining which remote vehicles 108 are closest to the first vehicle 106 can be based on a distance between each remote vehicle 108 and the first vehicle 106 and/or a time headway distance between each remote vehicle 108 and the first vehicle 106. In some embodiments, determining which remote vehicles 108 are closest to the first vehicle 106 can be based on the geoposition of the first vehicle 106 and the geoposition of the one or more remote vehicles 108. The processor 134 can determine the distance based on data from the first vehicle 106 and/or data transmitted from the remote vehicles 108. The processor 134 can compare the distances to determine which remote vehicles 108 are closest to the first vehicle 106. Similar to the dynamic nature of the communication range 1002 discussed above with block 902, the remote vehicles 108 that are closest to the first vehicle 106 are also dynamic in nature. For example, as shown in FIG. 10B, the set of N remote vehicles 1006' has been updated from the set of N remote vehicles 1006 in FIG. 10A. The set of N remote vehicles 1006' can be updated based on the distances between the remote vehicles 108 and the first vehicle 106. Further, in some embodiments which will be discussed in more detail herein, the set of N remote vehicles 1006' can be updated based on the sensor actuation time slot of each of the remote vehicles 108. In FIG. 10B, the set of N remote vehicles 1006' includes the remote vehicles 108a, 108b, 108c, 108f, 108k, 1081, 108r, 108s, and 108t.

In another embodiment, the set of N remote vehicles 1006 is based on the sensor actuation time slot of each of the remote vehicles 108. More specifically, the sensor actuation time slots of each of the remote vehicles 108 in the set of N remote vehicles 1006 are different. For example, in FIG. 10A, the sensor actuation time slot of each of the remote vehicles 108 in the set of N remote vehicles 1006 is indicated by the number displayed inside the host vehicle 106 and the remote vehicles 108. Thus, the sensor actuation time slot for a clock cycle 1004 of each of the remote vehicles 108 in the set of N remote vehicles 1006 is different. Similarly, in FIG. 10B, each of the remote vehicles 108 in the set of N remote vehicles 1006' and the first vehicle 106 have a different sensor actuation time slot for a clock cycle 1004'.

Referring again to FIG. 9, at block 908, the method 900 includes dividing a clock cycle into a plurality of time slots based on the set of N remote vehicles. The time slots can be of an equal duration. For example, the processor 134 of the first vehicle 106 can divide a clock cycle (e.g., 1 second) of the local clock 132, which is aligned with a PPS signal, into time slots each having an equal duration based on the number of vehicles in the set of N remote vehicles 1006 including the first vehicle 106. Thus, the number of time slots into which the clock cycle is divided can be based on a number of vehicles identified in the set of N remote vehicles 1006 including the first vehicle 106. In other embodiments, the number of time slots can be based on a sensor data acquisition process time or a data frame rate. In further embodiments, the number of time slots can be based on a capture interval discussed in detail with FIGS. 2 and 4 herein.

In FIG. 10A, an illustrative example of a clock cycle 1004 is shown according to the set of N remote vehicles 1006 and the first vehicle 106. Here, the clock cycle 1004 is divided into ten (10) time slots for assigning data acquisition times to each vehicle. The data frame 1004 begins at a time zero (0) of the clock cycle. Since each vehicle is synchronized according to the global time signal, each vehicle is configured to trigger data acquisition according to a common time frame. As shown in FIG. 10A, each vehicle in the set of N remote vehicles 1006 including the first vehicle 106 is assigned a time slot. FIG. 10B illustrates the clock cycle 1004' that also has been divided into ten (10) time slots according to the set of N remote vehicles 1006' and the first vehicle 106.

In some embodiments, the method 900 at block 908 can also include assigning a time slot to each remote vehicle in the set of N remote vehicles 1006 including the host vehicle 106. As discussed above with block 904, each of the remote vehicles 108 transmits a sensor actuation time slot that indicates a time or a time slot (e.g., according to the common time base) at which a sensor of the remote vehicle 108 is actuating. At block 906, the remote vehicles 108 selected to be in the set of N remote vehicles 1106 each have a different sensor actuation time slot. Accordingly, at block 908 the processor 134 can assign the time slots based on the sensor actuation time slot of each remote vehicle 108 in the set of N remote vehicles 1006. The processor 143 can communicate the assigned time slots for each remote vehicle to all the remote vehicles in the set of N remote vehicles 1006. In FIG. 10A, each remote vehicle in the set of N remote vehicles 1006 has been assigned a time slot according to the clock cycle 1004 based on the sensor actuation time slot received from each of the remote vehicles 108 in the set of N remote vehicles 1006. In FIG. 10B, the assignments in clock cycle 1004' have been updated based on the set of N remote vehicles 1006'.

At block 910, the method 900 optionally includes determining a capture interval. In one embodiment, as discussed above in detail with block 208 of FIG. 2, the capture interval is for a sensor data acquisition process time that that maximizes a total number of data frames that can be captured by the sensor unit 126 of the first vehicle 106 and by the sensor unit of the remote vehicles in the communication range 1002 (i.e., each remote vehicle in the set of N remote vehicles). In other words, the capture interval maximizes a time between actuation of the sensor units of the first vehicle 106 and the sensor units of each of the remote vehicles in the set of N remote vehicles.

The capture interval can be determined as described above in blocks 208 (FIG. 2) or 408 (FIG. 4). More specifically, a capture interval as applied to the set of N remote vehicles, is a period of time between actuation of each sensor unit of each vehicle in the set of N remote vehicles 1006 according to the sensor actuation time slot sequence. For example, with reference to the clock cycle 1004, the capture interval is a period of time between transmitting a sensor trigger pulse that actuates a sensor of the remote vehicle 108*f* and transmitting a sensor trigger pulse that actuates the sensor of the remote vehicle 108*k*, a period of time between transmitting the sensor trigger pulse that actuates the sensor of the remote vehicle 108*k* and transmitting a sensor trigger pulse that actuates a sensor of the first vehicle 106, and so on. Said differently, the capture interval is a period of time between each successive time a data frame is captured according to the sensor actuation time slots. Furthermore, as discussed above with block 208 of FIG. 2, the processor 134 can transmit a message to the remote vehicles in the set of N remote vehicles 1006 with the capture interval and/or a start time for data acquisition of the sensor data of each sensor unit.

Accordingly, at block 912, each remote vehicle 108 in the set of N remote vehicles 1006 transmits a sensor trigger pulse according to the plurality of time slots and the sensor actuation time slot. More specifically, sensor actuation of the sensor of the first vehicle 106 and the sensors of each of the remote vehicles 108 in the set of N remote vehicles 1006 is controlled by actuating, according to the capture interval, the sensor of the first vehicle 160 to capture sensor data from the sensor of the first vehicle 106 and the sensors of each of the remote vehicles 108 to capture sensor data from the sensors of each of the remote vehicles 108 in the set of N remote vehicles 1006.

For example, with reference to the clock cycle 1004 of FIG. 10A, the remote vehicle 108*f* actuates its sensor unit at time $t_1$, the remote vehicle 108*k* actuates its sensor unit at time $t_2$, the first vehicle 106 actuates its sensor unit at $t_3$ and so on. A capture interval that maximizes a time between actuation of each sensor unit based on ten (10) vehicles for a clock cycle is 100 ms. Thus, referring again to the clock cycle 1004 of FIG. 10A, the remote vehicle 108*f* actuates its sensor unit at time $t_1$ (i.e., 0 ms), the remote vehicle 108*k* actuates its sensor unit at time $t_2$ (i.e., 100 ms), the first vehicle 106 actuates its sensor unit at $t_3$ (i.e., 200 ms), and so on.

Although not discussed in detail with the method 900, it is understood that transmission and sharing of the captured sensor data can also be implemented as discussed above with FIGS. 2 and 4. Thus, controlling sensor actuation at block 912 can also include transmitting the captured sensor data. More specifically, the first vehicle 106 transmits to each of the remote vehicles 108 the sensor data from the sensor of the first vehicle 106 acquired by the actuation of the sensor of the first vehicle 106, and each of the remote vehicles 108 transmits to the first vehicle 106 and the other remote vehicles 108 in the set of N remote vehicles, the sensor data captured by the actuation of the sensors each of the remote vehicles 108, according to the plurality of time slots.

As mentioned above, because of the dynamic nature of the first vehicle 106 and the remote vehicles 108, the set of N remote vehicles 1006 can change in real time. In some embodiments, the processor 134 monitors a distance between the first vehicle 106 and each of the one or more remote vehicles 180 within the communication range 1002. The processor 143 can update the set of N remote vehicles 1006 based on the distance between the first vehicle 106 and each of the one or more remote vehicles 108, for example, at block 906. In some embodiments, the remote vehicles 108 in the set of N remote vehicles 1006 is updated at a predetermined time interval.

Based on the above, since each vehicle is synchronized to a common time base, each vehicle is able to transmit a sensor trigger pulse, thereby actuating its sensor, at an accurate time based on the assigned time slot and the common time base. Additionally, since each vehicle has a different sensor actuation time slot, interference issues (e.g., as discussed above with FIG. 8) are mitigated. Accordingly, in addition to time synchronization of sensor actuation, wireless vehicle communication can be used to synchronize sensor actuation to mitigate sensor interference issues.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling sensor data acquisition using a vehicular communication network, comprising:

establishing an operable connection for computer communication between a first vehicle and one or more remote vehicles within a communication range of the first vehicle using the vehicular communication network, wherein the first vehicle and the one or more remote vehicles operate based upon a common time base according to a global time signal;

receiving, from each of the one or more remote vehicles, capability data corresponding to the capabilities of sensors of each of the one or more remote vehicles, wherein the capability data includes a sensor actuation time slot of each of the one or more remote vehicles indicting a time slot at which the sensors of each of the one or more remote vehicles are actuating;

selecting a set of N remote vehicles from the one or more remote vehicles based on the capability data, wherein the set of N remote vehicles consists of those remote vehicles of the one or more remote vehicles within the communication range of the first vehicle that are closest to the first vehicle, and wherein the sensor actuation time slot of each of the remote vehicles in the set of N remote vehicles are different;

dividing a clock cycle into a plurality of time slots based on the set of N remote vehicles; and controlling, according to the plurality of time slots and the sensor actuation time slot, sensor actuation of a sensor of the first vehicle and the sensors of each of the remote vehicles in the set of N remote vehicles.

2. The computer-implemented method of claim 1, including updating the remote vehicles in the set of N remote vehicles at a predetermined time interval.

3. The computer-implemented method of claim 1, including determining a capture interval for a sensor data acquisition process time that maximizes a time between actuation of the sensor of the first vehicle and actuation of the sensors of each remote vehicle in the set of N remote vehicles.

4. The computer-implemented method of claim 3, wherein the capture interval maximizes the time between the actuation of the sensor of the first vehicle and the sensors of each of the remote vehicles based on a number of vehicles in the set of N remote vehicles.

5. The computer-implemented method of claim 3, wherein controlling, according to the plurality of time slots and the sensor actuation time slot, sensor actuation of the sensor of the first vehicle and the sensors of each of the remote vehicles in the set of N remote vehicles, includes actuating, according to the capture interval, the sensor of the first vehicle to capture sensor data from the sensor of the first vehicle and the sensors of each of the remote vehicles to capture sensor data from the sensors of each of the remote vehicles.

6. The computer-implemented method of claim 5, wherein the first vehicle transmits to each of the remote vehicles the sensor data from the sensor of the first vehicle acquired by the actuation of the sensor of the first vehicle, and each of the remote vehicles transmits to the first vehicle the sensor data from the sensors each of the remote vehicles by the actuation of the sensors each of the remote vehicles, according to the plurality of time slots.

7. The computer-implemented method of claim 1, wherein the capability data includes a geoposition of the one or more remote vehicles.

8. The computer-implemented method of claim 7, wherein selecting the set of N remote vehicles from the one or more remote vehicles based on the capability data is based on a geoposition of the first vehicle and the geoposition of the one or more remote vehicles.

9. A system for controlling sensor data acquisition using a vehicular communication network, comprising:
   a first vehicle including a first vehicle sensor, wherein the first vehicle is configured for computer communication with one or more remote vehicles using the vehicular communication network, wherein the one or more remote vehicles are within a communication range of the first vehicle and wherein the one or more remote vehicles include sensors; and
   a processor of the first vehicle that is configured to:
      receive capability data from each of the one or more remote vehicles, wherein the capability data indicates the capabilities of the sensors of each of the one or more remote vehicles, wherein the capability data includes a sensor actuation time slot of each of the one or more remote vehicles indicting a time slot at which the sensors of each of the one or more remote vehicles are actuating;
      select a set of N remote vehicles from the one or more remote vehicles based on the capability data, wherein the set of N remote vehicles consists of those remote vehicles of the one or more remote vehicles that are closest to the first vehicle, and wherein the time slot of each of the remote vehicles in the set of N remote vehicles are different;
      divide a clock cycle into a plurality of time slots based on the set of N remote vehicles; and
      control, according to the plurality of time slots, sensor actuation of the sensor of the first vehicle sensor.

10. The system of claim 9, wherein a local clock signal of the first vehicle and a local clock signal of each of the remote vehicles in the set of N remote vehicles are synchronized with a global positioning source.

11. The system of claim 9, wherein the processor updates the set of N remote vehicles at predetermined time interval.

12. The system of claim 9, wherein the processor determines a capture interval for a sensor data acquisition process time that maximizes a time between actuation of the first vehicle sensor and actuation of the sensors of each remote vehicle in the set of N remote vehicles.

13. The system of claim 12, wherein the processor determines the capture interval based on a number of vehicles in the set of N remote vehicle and a sensor data acquisition process time of each vehicle in the set of N remote vehicles.

14. The system of claim 12, wherein the processor, actuates according to the plurality of time slots and the sensor actuation time slot, the sensor of the first vehicle to capture sensor data from the sensor of the first vehicle.

15. A non-transitory computer-readable storage medium including instructions that when executed by a processor, cause the processor to:
   establish an operable connection for computer communication between a first vehicle and one or more remote vehicles within a communication range of the first vehicle using a vehicular communication network, wherein the first vehicle and the one or more remote vehicles are synchronized according to a global time signal;
   receive, from each of the one or more remote vehicles, capability data corresponding to the capabilities of sensors of each of the one or more remote vehicles, wherein the capability data a sensor actuation time slot of each of the one or more remote vehicles indicting a time slot at which the sensors of each of the one or more remote vehicles are actuating;
   select a set of N remote vehicles from the one or more remote vehicles based on the capability data, wherein the set of N remote vehicles consists of those remote vehicles of the one or more remote vehicles that are closest to the first vehicle, and wherein the time slot each of the remote vehicles in the set of N remote vehicles are different;
   divide a clock cycle into a plurality of time slots based on the set of N remote vehicles; and
   control, according to the plurality of time slots and the sensor actuation time slot, sensor actuation of a sensor of the first vehicle and the sensors of each of the remote vehicles in the set of N remote vehicles.

16. The non-transitory computer-readable storage medium of claim 15, causes the processor to monitor a distance between the first vehicle and each of the one or more remote vehicles within the communication range, and update the set of N remote vehicles based on the distance between the first vehicle and each of the one or more remote vehicles.

17. The non-transitory computer-readable storage medium of claim 15, causes the processor to determine a capture interval for a sensor data acquisition process time that maximizes a time between actuation of the sensor of the first vehicle and actuation of the sensors of each remote vehicle in the set of N remote vehicles.

18. The non-transitory computer-readable storage medium of claim 17, wherein the capture interval is based on a number of vehicles in the set of N remote vehicles.

19. The non-transitory computer-readable storage medium of claim 17, causes the processor to actuate, according to the capture interval, the sensor of the first vehicle to capture sensor data from the sensor of the first vehicle and the sensors of each of the remote vehicles to capture sensor data from the sensors of each of the remote vehicles.

20. The non-transitory computer-readable storage medium of claim 15, wherein the capability data includes a geoposition of the one or more remote vehicles.

* * * * *